(12) United States Patent
Okumura et al.

(10) Patent No.: US 6,215,617 B1
(45) Date of Patent: *Apr. 10, 2001

(54) SUPPORT MEMBER FOR MAGNETIC DISK SUBSTRATE

(75) Inventors: Masahiro Okumura; Shozi Hino, both of Shiga; Shinichi Yamaguchi, Kagoshima, all of (JP)

(73) Assignee: Kyocera Corporation, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,892

(22) Filed: Mar. 8, 1999

Related U.S. Application Data

(62) Division of application No. 08/609,136, filed on Feb. 29, 1996, now Pat. No. 5,969,902.

(30) Foreign Application Priority Data

Mar. 15, 1995 (JP) .......................................... 7-56075
Jul. 10, 1995 (JP) ......................................... 7-173485
Jul. 31, 1995 (JP) ......................................... 7-195298
Oct. 31, 1995 (JP) ......................................... 7-284221

(51) Int. Cl.$^7$ ................................................. G11B 17/038
(52) U.S. Cl. ..................................... 360/99.12; 360/98.08
(58) Field of Search ............................ 360/98.08, 99.12

(56) References Cited

U.S. PATENT DOCUMENTS 4,661,875 * 4/1987 Kinjo ..................................... 360/133
4,717,977 * 1/1988 Brown ................................. 360/98.07
5,319,512   6/1994 Grapenthin .......................... 360/106
5,436,775   7/1995 Ishimatsu .......................... 360/98.08
5,550,687   8/1996 Suzuki .............................. 360/98.08
5,760,999 * 6/1998 Yahata .............................. 360/98.01
5,917,677 * 6/1999 Moir et al. ........................ 360/99.12

FOREIGN PATENT DOCUMENTS 51-118408  10/1976  (JP) .
61-148667   7/1986  (JP) .
61-278023  12/1986  (JP) .
62-121972   6/1987  (JP) .
2-226566    9/1990  (JP) .
3-64933    10/1991  (JP) .
5-80745    11/1993  (JP) .
6-168536    6/1994  (JP) .

* cited by examiner

*Primary Examiner*—Brian E. Miller
(74) *Attorney, Agent, or Firm*—Hogan & Hartson, LLP.

(57) ABSTRACT

A magnetic disk substrate support member of glass or ceramic for supporting at least one magnetic disk substrate. The support member defines a contact surface which is flat to within 3 μm or less. The support member and the magnetic disk substrate mutually define a contact area in which the support member and the magnetic disk substrate define a ratio of between 50% and 95%. The support member may be a spacer or a shim. The magnetic disk substrate may be arranged on a substantially cylindrical hub and fixed to a rotary shaft via the spacer or shim and supported by a clamp.

7 Claims, 23 Drawing Sheets

, Ceramics

, Metal

SUPPORT MEMBER FOR MAGNETIC DISK SUBSTRATE

This is a division of application Ser. No. 08/609,136 filed Feb. 29, 1996, which application is hereby incorporated by reference in its entirety now U.S. Pat. No. 5,969,902.

BACKGROUND OF THE INVENTION

1. Field of the Invention

This invention relates to a magnetic disk unit used as an external storage of computers and a support member for magnetic disk substrate used for this.

2. Description of the Prior Art

Hitherto, as shown in FIG. 5, the magnetic disk unit is fixed by inserting multiple pieces of magnetic disk substrate 12 and spacer 20 alternately into a hub 11 fixed to a rotary shaft 10, and lastly pressing with a shim 30 and a clamp 40 and tightening with a screw 13. And by allowing the magnetic head 14 to move on the surface of the magnetic disk substrate 12 free from contact while the magnetic disk substrate 12 is being rotated by rotation of the above rotary shaft 10, the information is designed to be written to or read from the specified position of the magnetic disk substrate 12.

In recent years, these magnetic disk units 50 are required to achieve an extremely small levitation rate for the distance between the magnetic head 14 and the magnetic disk substrate 12 as the densification of information increases, and for this purpose, the magnetic disk substrate 12 was formed with ceramics or glass which is highly rigid and is difficult to generate deformation, and the support member such as spacers 20 for fixing the magnetic disk substrate 12, shims 30, and clamps 40 were formed with ceramics or glass same as those in the case of magnetic disk substrate 12 in order to prevent deformation of the magnetic disk 12 caused by a thermal expansion difference and to reduce weight (Japanese Patent Publication No. Hei 5-80745 and Japanese Paten Application Laid Open No. Sho 61-148667).

For example, the spacer 20 for holding the magnetic disk substrate 12 to given intervals is made of alumina ceramics as shown in FIG. 8 and formed into a ring shape 21.

On the other hand, in Japanese Patent Laid Open No. Sho 51-118408, support members such as spacers and shims are disclosed, which are designed to have a plurality of air grooves cut radially on the contact surface with the magnetic disk substrate 12 and form an air layer in the air groove in order to relieve stresses applied to the magnetic disk substrate 12 during clamping.

However, because ceramics or glass which comprises support members such as the spacer 20, shim 30, clamp 40, etc. are fragile, there was a fear of generating chipping at the edge due to the stress at the time of clamping. This broken piece may damage the magnetic disk substrate 12 or break the magnetic head 14, if it enters the clearance between the magnetic disk substrate 12 and the magnetic head 14 levitating on it.

On the other hand, with the support member designed to have air grooves cut on the contact surface and form air grooves in them, the greater the ratio of the air grooves accounting for the contact surface, the smaller is the contact surface with the magnetic disk substrate 12, possibly resulting in strain in the magnetic disk substrate 12. Consequently, it was unable to decrease the flatness of the magnetic disk substrate 12 at the time of clamping and it was unable to minimize the levitation rate of the magnetic head 14. In particular, when the magnetic disk substrate 12 deforms in the shape of a letter V, the magnetic head 14 collides against the magnetic disk substrate 12 to result in breakage.

In recent years, it has been known that static electricity is charged in the magnetic disk substrate 12 when the information is read or written and noise is generated to destroy the recording contents, but charging of the magnetic disk substrate 12 was unable to be prevented because ceramics and glass are, in general, insulating materials.

Under these circumstances, in this invention, the support members such as shims, clamps, and spacers are formed with ceramics or glass and at the same time the ratio of the actual contact surface is designed to be 50–95% as well as the flatness of this contact surface is made to be 3 µm or less.

It is an object of this invention to provide a magnetic disk unit comprising one or a plurality of magnetic disk substrate arranged on a nearly cylindrical hub to be fixed to a rotating shaft via ring-form spacers and shims and held by clamps, the said magnetic disk substrate being made from ceramics or glass and held by spacers and shims whose actual contact area ratio with the magnetic disk substrate is designed to be 50–95%, wherein the flatness of the contact surface is designed to be 3 µm or less.

It is another object of this invention to provide a magnetic disk unit in which a through hole perpendicular to the contact surface of support member such as shims or clamps is drilled to dispose springs in the through hole or to fill the through hole with conductive materials or cover the surface with conductive materials in order to achieve conductivity between the top and the bottom of the contact surfaces and prevent charging of the magnetic disk.

This invention relates to a support member for magnetic disk substrate for holding the magnetic disk substrate to a specified position and a magnetic disk unit comprising one or a plurality magnetic disk substrate held to a hub by means of this.

Hitherto, as shown in FIG. 12, the magnetic disk unit was fixed by alternately inserting a plurality of magnetic disk substrate 115 and spacer 111 into a hub 114 fixed to a rotary shaft 113 and lastly pressing them with shims 110 and clamps 112 and tightening with screws 116. And with the magnetic disk substrate 115 being rotated by the rotation of the rotary shaft 113, the magnetic head 117 was allowed to move on the surface of the magnetic disk substrate 115 free from contact so that the information is written or read at a specified position of the magnetic disk substrate 115.

In recent years, as the information density and the storage capacity increase, the magnetic disk unit 150 is required to further minimize the distance between the magnetic head 117 and the magnetic disk 115, increase flatness of the magnetic disk substrate 115, and improve smoothness of its surface, and, therefore, there is disclosed a magnetic disk substrate 115 using ceramics or glass, in which increased surface strength and improved surface smoothness are highly effectively achieved, and the support members such as spacers 111, shims 110, and clamps 112 for fixing and supporting the magnetic disk substrate 115 are formed with ceramics or glass for preventing deformation of the magnetic disk substrate 115 caused by thermal expansion difference as well as for reducing weight (Japanese Patent Publication No. Hei 5-80745, Japanese Non-examined Patent Publication No. Sho 61-148667).

However, because ceramics or glass composing the support member are, in general, insulating materials, it has recently been known that supporting the magnetic disk 115 with these support members charges the magnetic disk substrate 115, generates noises in writing or reading the information, and possibly destroys the recording contents, and therefore, there is disclosed a method for preventing charging of the magnetic disk 115 by using the support member with the contact surface with the magnetic disk substrate 115 coated with metallic film such as aluminum, zinc, etc. (Japanese Non-examined Patent Publication No. Hei 2-226566).

However, because the support member with the contact surface coated with metallic film causes a large thermal expansion difference between the ceramics or glass constituting the substrate and the metallic film, there is a problem in which the flatness of the contact surface is impaired by the heat resulting from high-speed rotation. In addition, there is a problem of burr specific to metal. Consequently, because forming a magnetic disk unit 150 using this support member causes strain in the magnetic disk substrate 115 and impairs the parallelism between magnetic disk substrates 115, it is unable to reduce the levitation rate of the magnetic head 117, possibly causing the magnetic head 117 to come in contact with the magnetic disk substrate 115 and breaking the magnetic head 117.

In addition, there is a fear of peeling of the metallic film due to the thermal expansion difference with the ceramics or glass forming the substrate, and as a result, there is a problem in which static electricity charged on the magnetic disk substrate 115 is unable to be released.

Furthermore, there is a problem in which when the inside and outside edges of the support member are sharp edges, the metallic film thickness coated to the edges become thinner, causing disconnection according to circumstances, and static electricity is unable to be released.

In addition, there is another problem in which since ceramics or glass forming the support member are fragile, sharp edges may cause chipping due to stress at the time of clamping and this broken piece entering the clearance between the magnetic disk substrate 115 and the magnetic head 117 levitating above the substrate may damage the magnetic disk substrate 115 or break the magnetic head 117.

Consequently, in the magnetic disk unit 150 in which the magnetic disk substrate 115 is held with these support members, it is difficult to achieve sufficiently high densification and high capacity of the information and static electricity charged in the magnetic disk substrate 115 may generate noise in reading or writing the information and may destroy the recording contents.

In view of the foregoing problems, it is a main object of this invention to provide a magnetic disk support members made of ceramics or glass, such as shims, clamps, and spacers, comprising the inside and outside edges of the support members provided with 0.004–0.5-mm-wide taper or curvature and at least the contact surface with the magnetic disk substrate and the inner circumferential surface coated with conductive ceramic film 0.1–3 $\mu$m thick.

It is an object of this invention to provide a magnetic disk unit by holding one or a plurality of magnetic disk substrate comprising ceramics or glass to the hub fixed to a rotary shaft and comprising conductive material via a spacer and/or shim in a ring form made of ceramics or glass and with 0.04–0.5 mm taper or curvature provided on inner and outer edges and at least with the contact surface with the magnetic disk and the inner circumferential surfaces coated with 0.1–3 $\mu$m conductive hard film.

More specifically, this invention is coated with any one type of conductive hard films of TiC, TiN, ZrN, HfC, TaC, ZrC, WC, VC, NbC, TiB$_2$, ITO (Indium Tin Oxide), and DLC (Diamond-like Carbon).

This invention relates to magnetic disk substrate support members such as spacers, shims, and clamps for holding the magnetic disk substrate to a specified position and a magnetic disk unit comprising glass magnetic disk substrates held by these support members.

Hitherto, as illustrated in FIG. 17, the magnetic disk unit was fixed by alternately inserting a plurality of magnetic disk substrate 215 and spacer 211 into a hub 214 fixed to a rotary shaft 213 and lastly pressing them with shims 210 and clamps 212 and tightening with screws 216. And with the magnetic disk substrate 215 being rotated by the rotation of the rotary shaft 213, the magnetic head 217 was allowed to move on the surface of the magnetic disk substrate 215 free from contact so that the information is written or read at a specified position of the magnetic disk substrate 215.

In recent years, as the information density and the storage capacity increase, the magnetic disk unit 250 is required to further minimize the distance between the magnetic head 217 and the magnetic disk 215, increase flatness of the magnetic disk substrate 215, and improve smoothness of its surface, and, therefore, there is disclosed a magnetic disk substrate 215 using ceramics or glass, in which increased surface strength and improved surface smoothness are highly effectively achieved, and the support members such as spacers 211, shims 210, and clamps 212 for fixing and supporting the magnetic disk substrate 215 are formed with ceramics or glass for preventing deformation of the magnetic disk substrate 215 caused by thermal expansion difference as well as for reducing weight (Japanese Patent Publication No. Hei 5-80745, Japanese Non-examined Patent Publication No. Sho 61-148667).

However, because ceramics or glass composing the support member are, in general, insulating materials, it has recently been known that supporting the magnetic disk 215 with these support members charges the magnetic disk substrate 215, generates noises in writing or reading the information, and possibly destroys the recording contents, and therefore, there is disclosed a method for preventing charging of the magnetic disk 215 by using the support member with the contact surface with the magnetic disk substrate 215 coated with metallic film such as aluminum, zinc, etc. (Japanese Non-examined Patent Publication No. Hei 2-226566).

However, because the support member with the contact surface coated with metallic film causes a large thermal expansion difference between the ceramics or glass constituting the substrate and the metallic film, there is a problem in which the flatness of the contact surface is impaired by the heat resulting from high-speed rotation. In addition, there is a problem of burr specific to metal. Consequently, because forming a magnetic disk unit 250 using this support member causes strain in the magnetic disk substrate 215 and impairs the parallelism between magnetic disk substrates 215, it is unable to reduce the levitation rate of the magnetic head 217, possibly causing the magnetic head 217 to come in contact with the magnetic disk substrate 215 and breaking the magnetic head 217.

In addition, there is a fear of peeling of the metallic film due to the thermal expansion difference with the ceramics or glass forming the substrate, and as a result, there is a problem in which static electricity charged on the magnetic disk substrate 215 is unable to be released.

Furthermore, though the metallic film is coated in a thin film form to prevent damage to flatness of the contact surface, because a slight sliding occurs between the magnetic disk substrate 215 and the support member due to high-speed rotation, causing wear or peeling of the metallic film with small hardness, there is a problem that static electricity is unable to be released.

In addition, there is another problem in which there is about 2 to $5 \times 10^{-6}/°C$. thermal expansion difference between the support member and the glass magnetic disk substrate even in the support member comprising conductive ceramics, generating strain in magnetic disk substrate 215 in a similar manner as in the case of the support member with the contact surface coated with metallic film or impairing the parallelism between magnetic disk substrates 215.

In the magnetic disk unit 250 required for further increased density and larger capacity, there has not been obtained any unit 250 which satisfies the requirements for those using the above support members.

In view of the foregoing problems, in this invention, the magnetic disk substrate support members such as shims, spacers, and clamps are formed with conductive forsterite ceramics whose volume specific resistance is less than $10^7$ Ω·cm.

This invention constructs a magnetic disk unit by inserting and fixing successively the above-mentioned support members and glass magnetic disk substrate into a hub comprising conductive materials.

This invention relates to a magnetic disk unit used as an external storage for computers and magnetic disk substrate support members used for the unit.

The magnetic disk unit used hitherto is designed to mount a plurality of magnetic disk substrates 315 and spacers 311 alternately to the hub 314 fixed to the rotary shaft 313, as shown in FIG. 20, press shims 310 and clamps 312, and tighten screws 316 for fixing. Rotating these magnetic disk substrates 315 by the rotation of the rotary shaft 313, the magnetic head 317 moves on the surface of each magnetic disk substrate 315 without contact, and writes or reads the information at a specified position of each magnetic disk substrate 315.

For the material of the magnetic disk substrate 315, aluminum substrates or glass substrates are used, the surface of which magnetic film is formed. On the other hand, for the support materials such as shims 310, spacer 311, and clamps 312, metallic materials such as aluminum or stainless steel are used.

In these magnetic disk units, in order to increase the recording density, the distance between the levitated magnetic head 317 and the magnetic disk substrate 315 should be minimized, and presently, this distance is required to achieve a levitation rate as small as 0.1 µm or less. Consequently, the present applicant has already proposed to use ceramic materials with high rigidity and small thermal expansion rate as a material for the magnetic disk substrate (for example, see Japanese Patent Publication No. Hei 3-64933, etc.). In addition to this, glass-coated ceramics, YAG, titanium, silicon, carbon, etc. have been proposed for the material of magnetic disk substrates 315.

However, with conventional metal shims 310 and spacers 311, and clamps 312, the maximum flatness achieved for the surface in contact with the magnetic disk substrate 315 is at most 3 µm and at the same time because it is easy to deform when tightened due to low rigidity, bending is likely to occur in the magnetic disk substrate 315 at the time of tightening. Because when the magnetic disk substrate 315 bends, it is likely to collide against the magnetic head 317, the levitation rate of the magnetic head 317 is unable to be reduced, giving rise to inconvenience that higher density recording is not possible.

When ceramic magnetic disk substrate 315 is used, if support members such as shims 310, spacers 311, and clamps 312 are made of aluminum or other metals, strain is generated in the magnetic disk substrate 315 or tightening becomes loose when high temperature occurs due to high-speed rotation during application because the difference between thermal expansion ratios of both is large.

Therefore, in a preferred embodiment of this invention, the magnetic disk substrate support members such as shims, spacers, and clamps are formed with ceramics or glass with thermal expansion ratio lower than $12 \times 10^{-6}$°C., and at the same time the flatness of the surface in contact with magnetic disk substrate is designed to be 3 µm or lower. And combining this support member and a plurality of magnetic disk substrates, a magnetic disk unit is composed.

The support members referred to in this invention include spacers used for holding a plurality of magnetic disk substrate to specified intervals, and shims and clamps for mounting this magnetic disk substrate to the rotary shaft.

This invention relates to the magnetic disk unit used for external storage of computers and the support member for magnetic disk substrate used for the unit.

The magnetic disk unit used hitherto is designed to mount a plurality of magnetic disk substrates 415 and spacers 411 alternately to the hub 414 fixed to the rotary shaft 413, as shown in FIG. 25, press shims 410 and clamps 412, and tighten screws 416 for fixing. Rotating these magnetic disk substrates 415 by the rotation of the rotary shaft 413, the magnetic head 417 moves on the surface of each magnetic disk substrate 415 without contact, and writes or reads the information at a specified position of each magnetic disk substrate 415.

For the material of the magnetic disk substrate 415, aluminum substrates or glass substrates are used, the surface of which magnetic film is formed. On the other hand, for the support materials such as shims 410, spacers 411, and clamps 412, metallic materials such as aluminum or stainless steel are used (see for example Japanese Patent Publication No. Sho 61-278023).

In these magnetic disk units, in order to increase the recording density, the distance between the levitated magnetic head 417 and the magnetic disk substrate 415 should be minimized, and presently, this distance is required to achieve a levitation rate as small as 0.1 µm or less. Consequently, the present applicant has already proposed to use ceramic materials with high rigidity and small thermal expansion rate as a material for the magnetic disk substrate (for example, see Japanese Patent Publication No. Hei 3-64933, etc.). In addition to this, glass-coated ceramics, YAG, titanium, silicon, carbon, etc. have been proposed for the material of magnetic disk substrates 415.

However, with conventional metal shims 410 and spacers 411, and clamps 412, the maximum flatness achieved for the surface in contact with the magnetic disk substrate 415 is at most 5 µm and at the same time because it is easy to deform when tightened due to low rigidity, bending is likely to occur in the magnetic disk substrate 415 at the time of tightening. Because when the magnetic disk substrate 415 bends, it is likely to collide against the magnetic head 417, the levitation rate of the magnetic head 417 is unable to be reduced, giving rise to inconvenience that higher density recording is not possible.

When ceramic magnetic disk substrate 415 is used, if support members such as shims 410, spacers 411, and clamps 412 are made of aluminum or other metals, strain is generated in the magnetic disk substrate 415 or tightening becomes loose when high temperature occurs due to high-speed rotation during application because the difference between thermal expansion ratios of both is large.

Therefore, a proposal has been made to form the support members such as shims, 410, spacers 411, clamps 412, etc. with ceramics, but in this case, hardness of the support member is excessively high and the magnetic film formed on the surface of the magnetic disk substrate 415 at the time of high-speed rotation is scraped away by ceramics, causing metallic powder.

In this invention, magnetic disk base support members such as shims, spacers, clamps are formed with ceramics with thermal expansion ratio $20 \times 10^{-6}$°C., and the surface in contact with the magnetic disk substrate is coated with film of 450 kg/mm$^2$ or less, and the flatness of this contact surface is 5 μm or less. And combining these support members and magnetic substrates, a magnetic disk unit is composed.

The support members referred to in this invention include spacers used for holding a plurality of magnetic disk substrate to specified intervals, and shims and clamps for mounting this magnetic disk substrate to the rotary shaft.

According to this invention, because support members are formed with ceramics, a large rigidity can be achieved and the flatness of the contact surface with the magnetic disk can be improved, it is possible to maintain the magnetic disk to a high accuracy. Because the film with small hardness is provided on the support member surface, scraping of magnetic film on the magnetic disk surface can be prevented.

DESCRIPTION OF THE PREFERRED EMBODIMENT

Now description will be made of embodiments according to this invention.

Figure 1A:
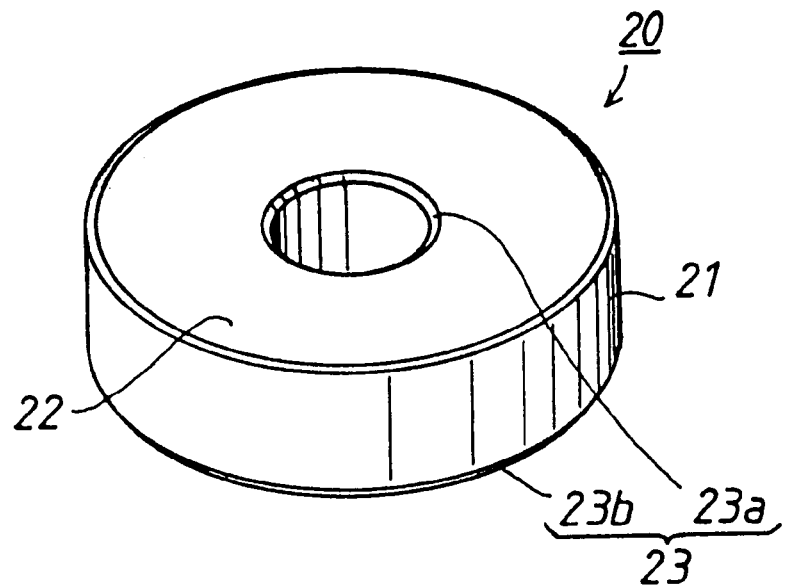
FIG. 1 is a perspective view showing one example of support member related to this invention and (a) is a spacer and (b) a clamp.
Figure 1B:
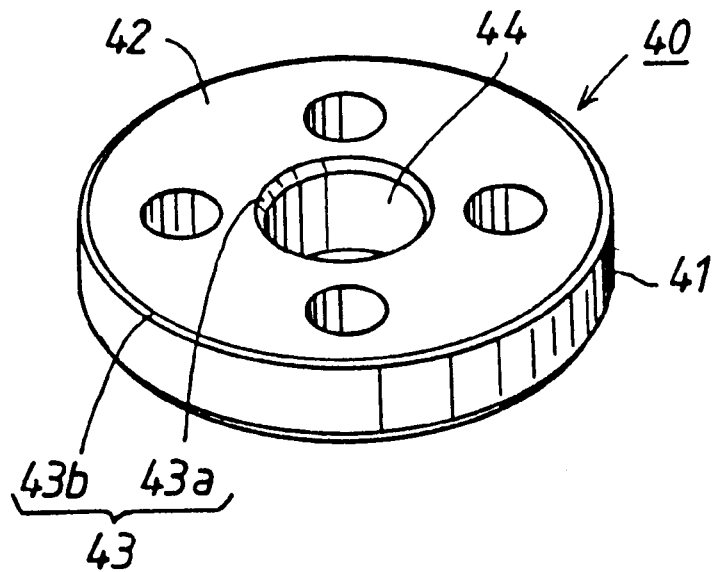
Figure 2A:
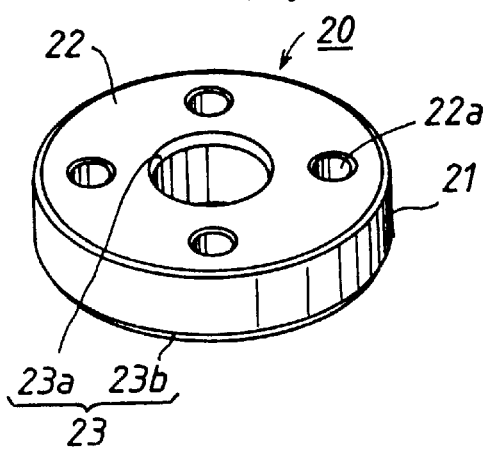
FIG. 2 (a) to (e) are perspective views showing other embodiments of the spacer related to this invention.
Figure 2B:
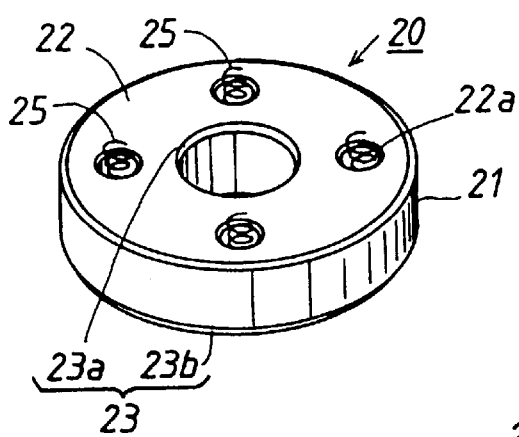
Figure 2C:
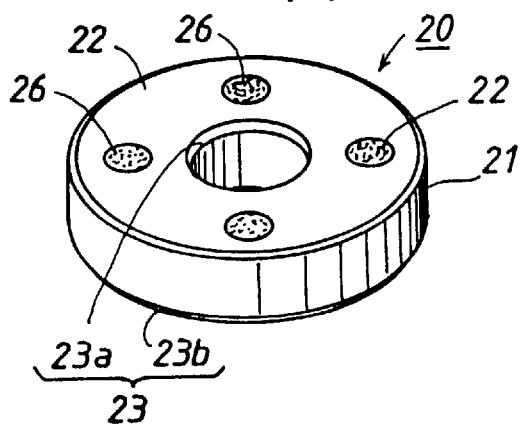
Figure 2D:
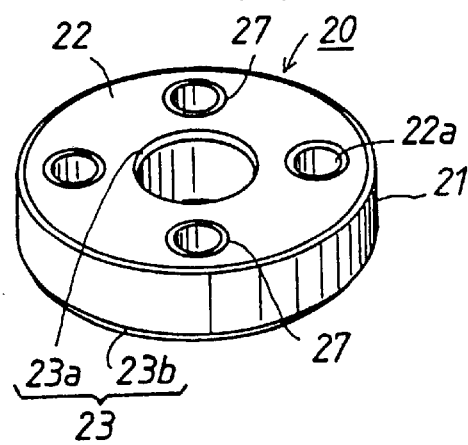
Figure 2E:
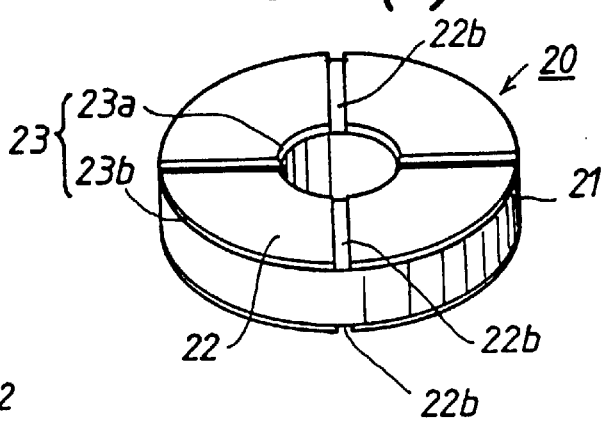

FIG. 1 (a) and (b) are perspective views showing magnetic disk substrate support members related to this invention, and (a) shows a spacer and (b) a clamp.

First of all, as shown in FIG. 1 (a), the spacer 20 is a ring 21 made of ceramics or glass, and to the inner and outer edges 23a, 23b, the as-sintered surface C is formed for the portion to be chamfered to prevent chipping.

The contact surface 22 is finished to surface roughness of 0.2–2.0 μm in terms of center line average roughness (Ra) to prevent turning of the fixed magnetic disk substrate, and at the same time the flatness of the contact surface 22 is brought to 3 μm or less to prevent generation of strain in the magnetic disk substrate when clamped, and furthermore, the parallelism of top and bottom contact surfaces 22 is kept 5 μm in order to allow the magnetic disk substrate to provide a specified clearance.

The shim 30 is not illustrated, but is of the same profile as that of the spacer but is slightly thinner.

Next, as shown in FIG. 1 (b), the clamp 40 is a disk or plate type product 41 comprising either ceramics or glass. The contact surface 42 is finished to surface roughness of 0.2–2.0 μm in terms of center line average roughness (Ra) to prevent turning of the fixed magnetic disk substrate, and at the same time the flatness of the contact surface 42 is brought to 3 μm or less. At the center of the contact surface 42, an indent portion 44 is provided for latching to the hub tip end section, and to the edge 43a of the indent section 44 and to the outer circumferential edge 43b of the plate-form product 41, the as-sintered surface C is formed for the intended section 44.

For other examples of support members such as spacers 20, shims 30, and clamps 40, those with through-holes or grooves may be acceptable.

For example, the spacer 20 shown in FIG. 2 (a) has four through holes 22a drilled on the contact surface, and designing the spacer in this kind of construction is able to reduce the weight of the spacer 20. And supporting the magnetic disk substrate 12 using this spacer 20 can greatly reduce the weight applied to the rotary shaft 10, thereby allowing the magnetic disk substrate 12 to rotate at a high speed with a small torque. The through holes 22a drilled on the contact surface 22 may be acceptable if two or more holes are drilled at equal intervals.

The spacer 20 shown in FIG. 2 (b) has four through holes 22a drilled on the contact surface 22 as in the case of spacer 20 shown in FIG. 2 (a), and in addition, to the through hole 22a, a spring 25 comprising a conductive material such as metal is placed with both ends slightly protruding from each contact surface 22. Consequently, if this spacer 20 is used to hold the magnetic disk substrate 12, both ends of the spring 25 are able to house in the through-hole 22a because of elastic action, thereby preventing deformation of the magnetic disk substrate 12, and furthermore, because both ends of the spring 25 come in contact with the magnetic disk substrate 12 arranged on top and bottom contact surfaces 22 of the spacer 20, static electricity charged to the magnetic disk substrate 12 is allowed to escape, thereby preventing the recording contents from being destroyed.

The spring 25 may be designed to be inserted into the through hole 22a of the spacer when assembling the magnetic disk unit 50, and for increased assembly operation efficiency, the spring 25 may be placed in the through hole 22a as well as affixed with adhesives, etc.

The spacer 20 shown in FIG. 2 (c) has conductive material 26 filled in the through hole 22a in place of the spring 25 so that continuity is achieved between the top and the bottom contact surfaces 22. The whole surface of the conductive material 26 is not necessarily located on the same plane of the contact surface 22, and part may be located on the same plane as that of each contact surface. For the conductive material 26, aluminum, zinc, carbon and other metal or conductive resin may be used.

The spacer 20 shown in FIG. 2 (d) has the inner wall surface of the through hole 22a covered with conductive film 27 so that weight is reduced and continuity between the top and the bottom contact surfaces 22 can be achieved. The edge of the through hole 22a and others are chamfered to surface C and this is also covered with the conductive film 27.

Consequently, the use of the spacer 20 shown in FIG. 2 (c) and (d) can also release static electricity charged in the magnetic disk.

The spacer 20 shown in FIG. 2 (e) has a plurality of air groove 22b radially formed, respectively, on the top and the bottom contact surfaces 22 and the adoption of this construction can not only reduce weight of the spacer 20 but also form an air layer at the air groove 22b to relieve stress applied to the magnetic disk substrate 12 at the time of clamping, thereby alleviating strain generated in the magnetic disk substrate 12.

Figure 5:
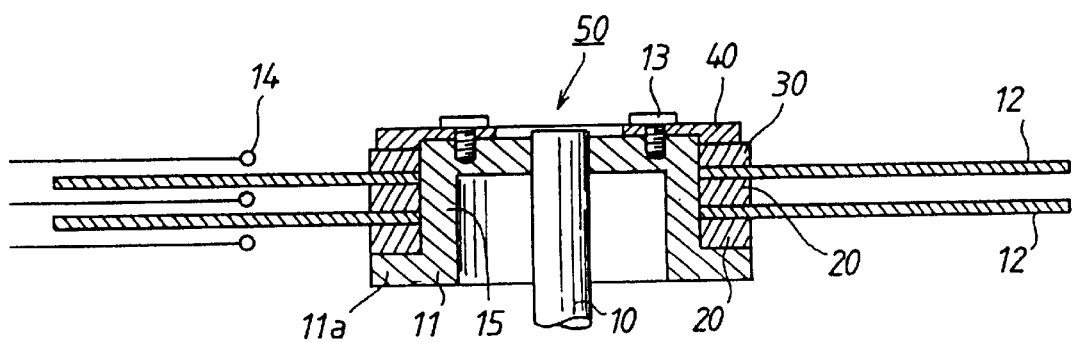
FIG. 5 is a longitudinal sectional view of magnetic disk unit related to this invention.
Figure 6A:
FIG. 6 is a schematic view showing interference fringes observed in magnetic disk substrates when the magnetic disk substrate is held with a spacer with varying actual contact area ratios.
Figure 6E:
Figure 6B:
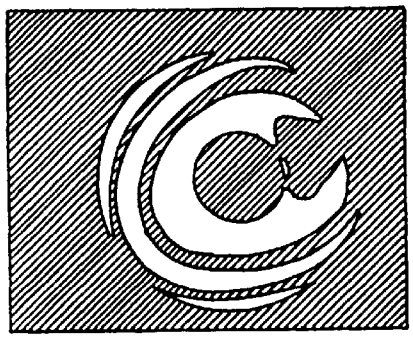
Figure 6F:
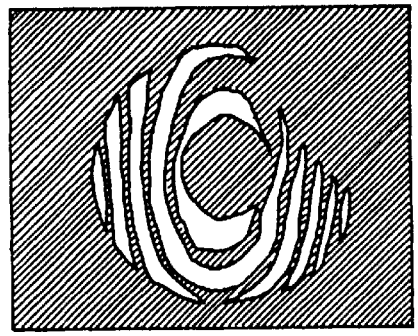
Figure 6C:
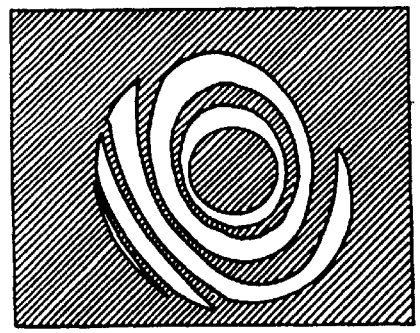
Figure 6G:
Figure 6D:

Now, the magnetic disk unit 50 with the magnetic disk substrate 12 supported by these spacers 20, shims 30, and clamps 40 is shown in FIG. 5.

To the rotary shaft 10, a metal hub 11 in a nearly cylindrical profile 14 equipped with a flange section 11a is fixed, and to the flange section 11a of the hub 11, a multiplicity of magnetic disk substrate 12 and spacer 20 are inserted alternately, and at least are retained with shims 30 and clamps 40, and with this configuration, the magnetic disk substrate 12 is placed and held between by the flange section 11a of the hub 11 and the clamp 40 and at the same time the magnetic disk substrate 12 is supported at specified intervals with the spacer 20 (shim 30), and in addition, by tightening the clamp 40 with the screw 13 to the hub 11, the magnetic disk substrate 12 is designed to be fixed. While the magnetic disk substrate 12 is being rotated at a high speed via the rotary shaft 10, using the magnetic head 14 levitated slightly away from the surface of the magnetic disk substrate 12, information is written and read.

The magnetic disk substrate 12 equipped into the magnetic disk unit 50 is formed with ceramics such as alumina or glass, which is lightweight, highly rigid, and difficult to deform, to meet recent increased requirements for higher densification of information, and in the ceramic substrate, a glazed surface is formed on the surface and by forming the magnetic film on the glazed surface, the magnetic disk substrate 12 is able to be obtained, and in the glass substrate, by forming the magnetic film on the surface, the magnetic disk substrate 12 is able to be obtained. In addition, it is possible to use titanium, silicon, YAG, carbon, etc. for other substrate materials.

In particular, because it is possible to achieve the thermal expansion coefficient same as or approximate to that of the magnetic disk substrate 12 if the magnetic disk substrate 12 is supported with the support member according to this invention, the strain of the magnetic disk substrate 12 involved in the thermal expansion difference is canceled and the levitation rate of the magnetic head 14 can be best minimized, and the information recording density can be improved.

In the magnetic disk unit 50 shown in FIG. 5, the magnetic disk substrate 12 is supported by shims 30 intervening between the magnetic disk substrate 12 on the uppermost part and the clamp 40 but in addition to this, it may be designed to be supported by directly bringing the clamp 40 in contact with the magnetic disk substrate 12, and in this case, the use of the clamp 40 shown in FIG. 1 (b) can achieve the accurate support of the magnetic disk substrate 12. It may also be designed to remove the spacer 20 arranged between the flange section 11a of the hub 11 and the magnetic disk substrate 12 and support the magnetic disk substrate by bringing them in direct contact. Furthermore, in order to eliminate the thermal expansion difference with the magnetic disk substrate 12, it is desirable to form the hub 11 with ceramics or glass.

Now, for the materials composing the support member such as spacers 20, shims 30, and clamps 40, it is possible to use ceramics or glass shown in Table 1 whose thermal expansion coefficient is $20 \times 10^{-6}/°C.$, and more preferably $12 \times 10^{-6}/°C.$ or less.

Depending on the material of the magnetic disk substrate 12, the material with approximate thermal expansion coefficient may be selected and applied from the materials of the support member. For example, when ceramic magnetic substrate 12 is used, ceramics with thermal expansion coefficient equivalent to or less than $10 \times 10^{-6}/°C.$ in Table 1 may be used as the support member, and similarly, when glass magnetic disk substrate 12 (thermal expansion coefficient: 8.0 to 9×10$^{-6}$/°C.) is used, ceramics or glass such as forsterite, etc. whose thermal expansion coefficient is 8.0× 10$^{-6}$/°C. or higher in Table 1 is suitably used as support member.

TABLE 1

| Material | Thermal expansion coefficient (× 10$^{-6}$/° C.) |
|---|---|
| Alumina | 6.5–7.3 |
| Zirconia | 9.5–11.5 |
| Silicon carbide | 3.5–4.5 |
| Silicon nitride | 2.5–3.5 |
| Cermet | 7.0–8.0 |
| Forsterite | 8.0–12.0 |
| SiO$_2$ based glass | 8.5 |
| PbO—ZnO—B$_2$O$_3$ based glass | 7.0–8.0 |
| PbO—B$_2$O$_3$ based glass | 7.0–9.0 |
| Na$_2$O—BaO—SiO$_2$ based glass | 8.5–11.0 |
| Na$_2$O—Al$_2$O$_3$—B$_2$O$_3$—SiO$_2$ based glass | 7.0–10.0 |
| K$_2$O—PbO—SiO$_2$ based glass | 8.0–9.5 |

Now, the edges 23, 43 of the support member such as spacers 20, shims 30, and clamps 40 are chamfered to C surface, R surface, or tapered surface with greater taper angle than C surface to prevent chipping by stress at the time of clamping, but this invention is characterized by keeping this chamfered portion as-sintered surface. That is, if it is intended to chamfer the edge portions 23, 43 of the sintered support member, it takes extremely long time to process one support member and microcracks are generated in the polished chamfered surface, possibly generating chipping due to the stress at the time of clamping, but if the chamfered portion is kept as sintered, it possesses the original strength which the sintered products provides, and chipping due to stress at the time of clamping may be prevented.

The as-sintered chamfered surface referred to herein is defined as a surface which is sintered after the chamfered portion of a specified profile is formed beforehand by general forming process such as uniaxial press forming, isostatic press forming, or cast forming, and after sintering, no polishing nor grinding is provided for the chamfered portion.

Figure 3:
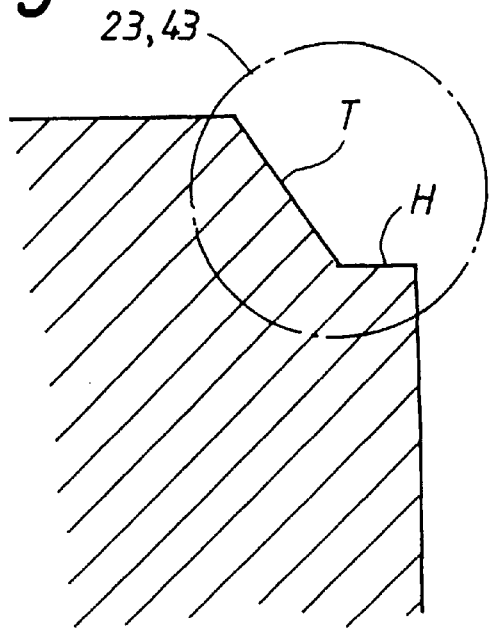
FIG. 3 is a schematic sectional view showing the structure of the peripheral area of a support member related to this invention formed by uniaxial press former.

For example, when the surface C is formed by a uniaxial press former such as a mechanical press, as shown in FIG. 3, the chamfered portion comprising the tapered surface T and the plane H is integrally formed, and then sintered, and the outer circumferential surface is polished to a specified size. In this event, the edge portions 23, 43 of the support member have the plane H removed and the surface C portion left. And this surface C becomes the as-sintered chamfered portion referred to herein. In the above example, a chamfered portion with the plane H removed is shown but it may have the plane 2 slightly left or furthermore, the support member may have a chamfered portion comprising both tapered surface T and plane H with the whole plane H completely left. Even this kind of support member will not generate chipping at the chamfered portion.

On the other hand, as the volume of the chamfered portion formed in the support member increases and the contact area of the contact surfaces 22, 42 in contact with the magnetic disk substrate 12 decreases, a large strain may be generated on the fixed magnetic disk substrate 12. Even in the ratio of through holes 22a or air grooves 22b formed on the contact surface 22, 42 increases, there is no fear of generating strain in magnetic disk substrate 12.

Consequently, in this invention, the ratio of actual contact area of the support member is set in the range of 50–95%, more preferably 70–95%.

Figure 4:
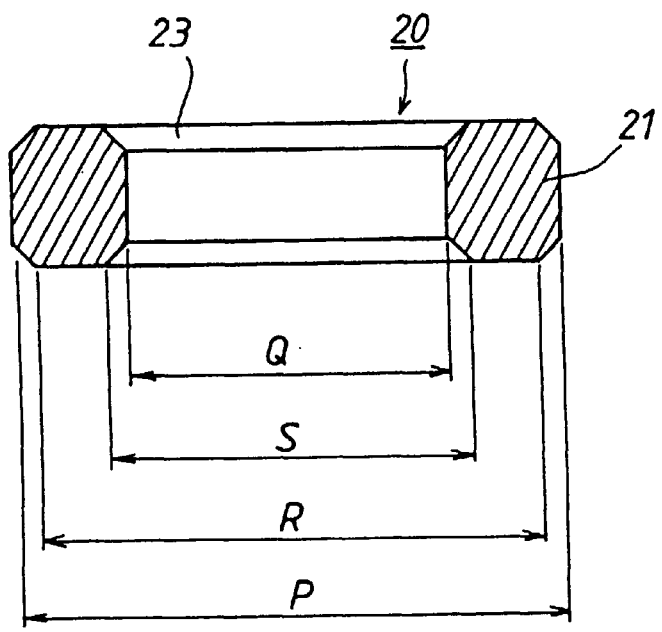
FIG. 4 is a longitudinal sectional view of spacer shown in FIG. 1 (a)

The ratio of actual contact area referred to herein is the ratio of the contact surface 22, 42 after the chamfered portion, through hole 22a, and air groove 22b are formed on the edge portions 23, 43 to the overall area of the contact surface 22, 42 before the chamfered portion, through hole 22a, or air groove 22b are formed on the edge portions 23, 43 of the support member, and for example, when each size of the space 20 shown in FIG. 1(a) are set as shown in FIG. 4, it is the value computed by the following equation.

Equation:

Ratio of actual contact area $(\%)=(R^2-S^2)/(P^2-Q^2)\times 100$

If the ratio of actual contact area is less than 50%, the contact area with the magnetic disk substrate 12 is excessively so small that the magnetic disk substrate 12 deforms at the time of clamping and the levitation rate of the magnetic head 14 is unable to be minimized, and if the condition aggravates, the disk substrate 12 deforms in a letter V and the generation of this deformation causes the magnetic head 14 to come in contact with the substrate and break.

The higher the ratio of actual contact area, the higher is the flatness of the magnetic disk substrate 12, but when it exceeds 95%, the chamfered rate becomes excessively small, and even if the chamfered portion is provided, chipping may result from the stress at the time of clamping. Consequently, it is important to set 95% for the upper limit of the ratio of actual contact area, and forming the chamfered portion on the edges 23, 43 in this range will not generate chipping due to stress at the time of clamping.

In the support member related to this invention, it is important to keep the flatness of the contact surfaces 22, 42 to 3 μm or less, preferably 1 μm or less, and more preferably 0.3 μm or less in order to prevent strain in the clamped magnetic disk substrate 12 as in the case of the ratio of actual contact surface.

In addition, it is important to achieve the moderately rough surface for the contact surfaces 22, 42.

That is, if the surface roughness of the contact surfaces 22, 42 is less than 0.2 μm in terms of the center line average roughness (Ra), the contact surfaces 22, 42 are too soft to prevent slip of the magnetic disk substrate 12 rotating at high speed, and conversely, if it is greater than 2.0 μm in terms of the center line average roughness (Ra), large deformation is generated in the magnetic disk substrate 12, and it is unable to bring the flatness to 2 μm or lower and at the same time, there is a possibility to damage the magnetic disk substrate 12.

Consequently, it is recommended to provide surface roughness of 0.2 μm to 2.0 μm in terms of center line average roughness (Ra) to the contact surfaces 22, 42.

In this way, because in this invention, the support member for holding the magnetic disk substrates 12 at given intervals is made of ceramics or glass, deformation of the magnetic disk substrate 12 arising from the thermal expansion difference can be prevented in a large scale, and because the ratio of the actual contact area is kept to 50–95% and at the same time the flatness is set to 3 μm or less, no V-letter deformation is generated in the magnetic disk substrate 12, and even if any deformation is generated, the strain rate is minor and allows the substrate to smoothly deform, enabling stable writing and reading of the information. In addition, because the chamfered portion formed on the edges of the support member is an as-sintered surface, chipping generated by stress at the time of clamping can completely be prevented.

Consequently, if the magnetic disk substrate 12 is supported by the support member to form a magnetic disk unit, the flatness of the magnetic disk substrate 12 can be brought to 2 μm or less, and therefore, the levitation rate of the magnetic head can be kept to 0.1 μm or less, achieving high-density recording.

Now, the flatness and deformation degree of the magnetic disk substrate 12 when it is supported with these spacers 20 were measured with the optical interferometer while varying the ratio of the actual contact area of spacer 20.

The spacer 20 used in this measurement was a ring 21, 24 mm in outside diameter and 20 mm in inside diameter, and the surface C was formed for the as-sintered chamfered portion on the inner and outer edges 23, and the flatness and deforming condition of the magnetic disk substrate 12 were measured with the ceramic magnetic disk substrate 12, 65 mm in outside diameter supported with the spacer 20 as shown in FIG. 5.

The value of the varied ratio of actual contact area and the flatness at that time are as per shown in Table 2, and the deforming degree of relevant conditions is shown as per FIG. 6.

For the evaluation standard in this measurement, the magnetic disk substrates free from V-letter form deformation and with flatness 2 μm or less were regarded as excellent.

TABLE 2

|  | No. | Ratio of actual contact area (%) | Flatness (μm) | Rating |
| --- | --- | --- | --- | --- |
| This invention | 1 | 90 | 0.6 | ○ |
|  | 2 | 80 | 0.9 | ○ |
|  | 3 | 70 | 1.2 | ○ |
|  | 4 | 60 | 1.2 | ○ |
|  | 5 | 50 | 1.5 | ○ |
| Comparison | 6 | 40 | 2.1 | X |
|  | 7 | 30 | 3.9 | X |

As clear from Table 2, because the ratio of actual contact area is less than 50% for sample No. 6 and 7, the flatness of the magnetic disk substrate 12 was deformed as greatly as 2.1–3.9 μm and it was unable to bring it down to 2 μm of less. As clear from (6) and (7) in FIG. 6, because long oval interference fringes were observed in a large quantity and their intervals were extremely small, localized pointed tips were formed on both ends on the major axis of the oval interference fringe and V-letter shape deformation was formed.

On the contrary, because in sample No. 1–5 related to this invention, the ratio of the actual contact area was 50% or more, it was possible to keep the flatness of the magnetic disk substrate 12 to be 1.5 μm or less and it was able to satisfy the standard value. As clear from (1)–(5) in FIG. 6, the intervals of interference fringes were large and the interference fringes were not long oval but smooth circle and free from any localized pointed tips.

In particular, with sample No. 1–3 with the ratio of actual contact area 70% or more, smooth circular interference fringes are observed, indicating that the substrate deforms in an extremely smooth conical shape. Consequently, if the magnetic head 14 is levitated on this magnetic disk substrate 12, it can be located with a specified distance constantly maintained in a specified track, enabling stable and high-density recording.

Figure 7:
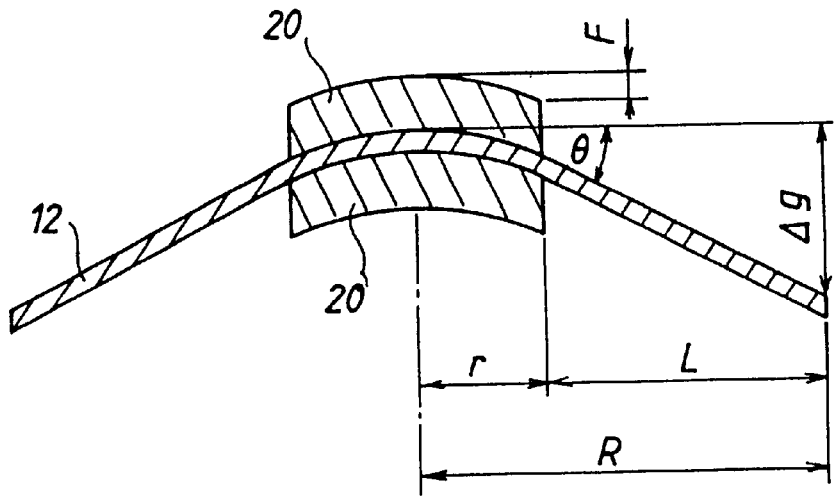
FIG. 7 is a schematic illustration showing the strain rate of the magnetic disk substrate in the magnetic disk unit related to this invention.
Figure 8:
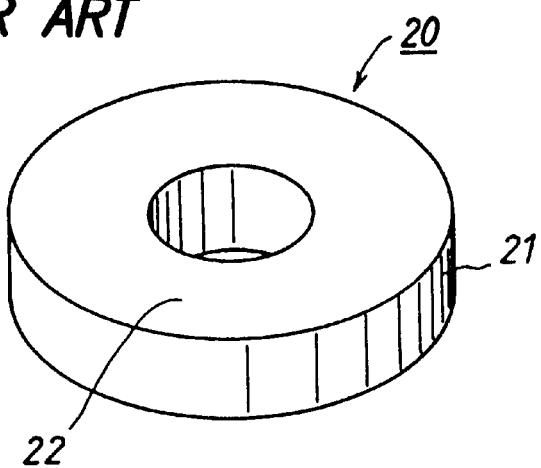
FIG. 8 is a perspective view showing a spacer, one example of conventional support members.

Next, using a spacer 20 with the 90% ratio of actual contact area, flatness of the contact surface 22 was varied, and the rate of change at the peripheral area of the magnetic disk substrate 12 was measured when it was supported with this spacer 20. As shown in FIG. 7, when the maximum deflection was generated by supporting the magnetic disk substrate 12 of radius R using the spacer 20 with the radius r and flatness F of the contact surface 22, the camber angle θ of the magnetic disk substrate 12 is expressed by $$\theta = \tan^{-1}(2Fr/r^2 - F^2)$$

and if L=R−r, the rate of change Δg at the peripheral area of the magnetic disk substrate 12 is expressed as $$\Delta g = L \tan \theta F$$

$$= (2Fr/(r^2 - F^2))L + F.$$

Now let r=11.53 mm and L=20.97 mm and change the value of flatness F, then we have Δg as shown in Table 3.

TABLE 3

|  | No. | Flatness (μm) | Δg (μm) |
| --- | --- | --- | --- |
| This invention | 1 | 0.1 | 0.5 |
|  | 2 | 0.2 | 0.9 |
|  | 3 | 0.3 | 1.3 |
|  | 4 | 1.0 | 4.6 |
| Comparison | 5 | 3.0 | 13.9 |
|  | 6 | 5.0 | 23.1 |

As clear from Table 3, by setting the flatness F to 3 μm or less and preferably 1 μm or less, Δg can be extremely minimized.

As described above, this invention is designed to form the support member such as shims, clamps, and spacers with ceramics or glass and to set the ratio of actual contact area with the magnetic disk substrate to 50–95% and the flatness of the contact surface to 3 μm or less so that chipping generated at the edge due to stress at the time of clamping is prevented as well as the flatness of the magnetic disk substrate is improved and the levitation rate of the magnetic head is minimized.

In this invention, by composing the magnetic disk unit by supporting the magnetic disk substrate with spacers and shims comprising the support member, it is possible to increase the information recording density. In particular, if the magnetic disk unit is composed by combining the magnetic disk substrate made of ceramics or glass, deformation of the magnetic disk substrate is not generated at the time of clamping and the thermal expansion coefficient of the support member can be matched with that of magnetic disk substrate, and therefore, high-density recording of information is possible.

In addition, this invention can effectively release static electricity charged in the magnetic disk substrate and prevent the recording contents from being destroyed by drilling through holes perpendicular to the contact surface, placing springs comprising conductive materials inside the through holes, filling the through holes with the conductive materials or covering the inner wall surface of the through holes with the conductive film to achieve continuity between the top and the bottom contact surfaces, if support members such as the shims and clamps are formed with insulating ceramics or glass.

Now, description will be made on embodiments of this invention.

Figure 9A:
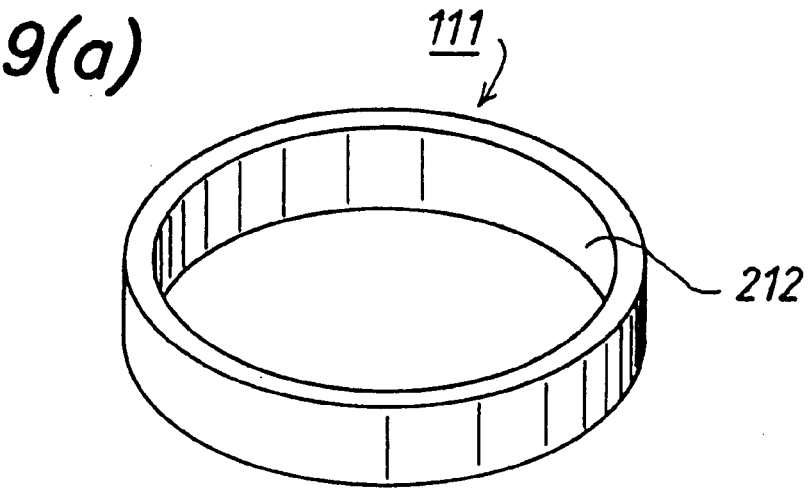
FIG. 9 is a schematic illustration showing a spacer, one example of support members related to this invention, and (a) is a perspective view and (b) a sectional view.
Figure 9B:
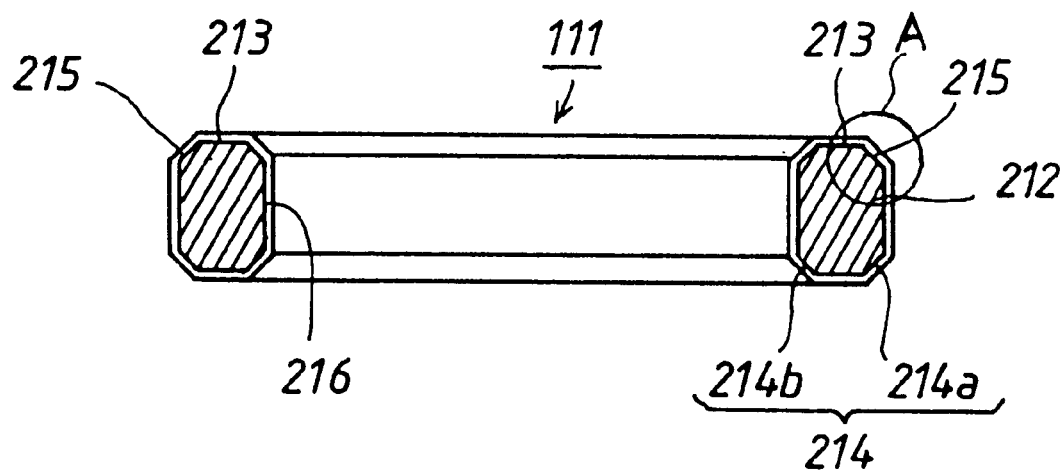
Figure 10A:
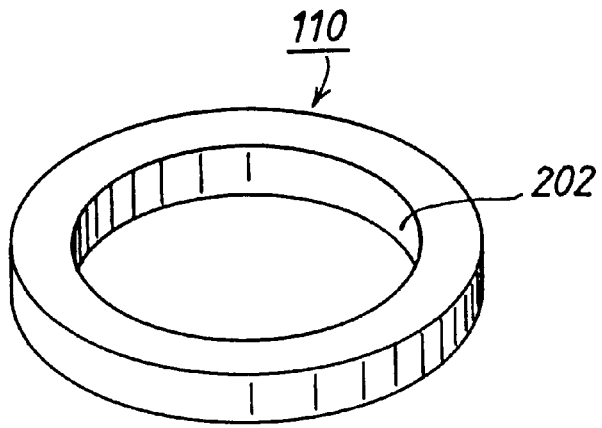
FIG. 10 is a schematic illustration showing a shim, one example of support members related to this invention, and (a) is a perspective view and (b) a sectional view.
Figure 10B:
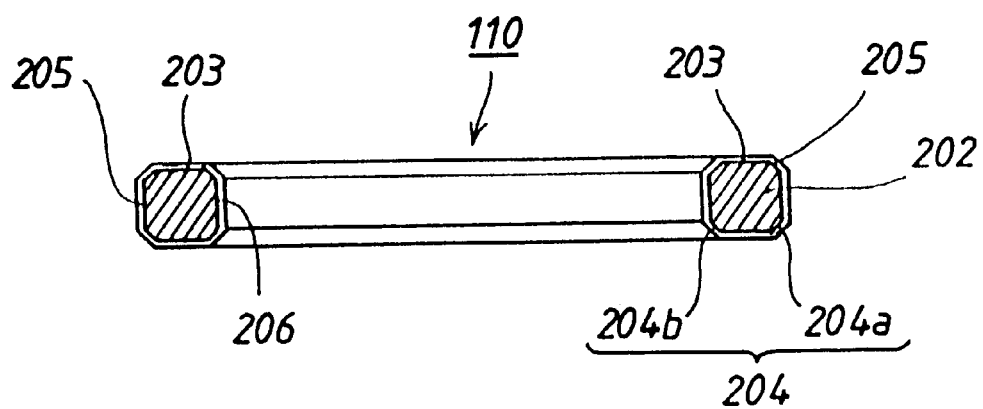
Figure 11A:
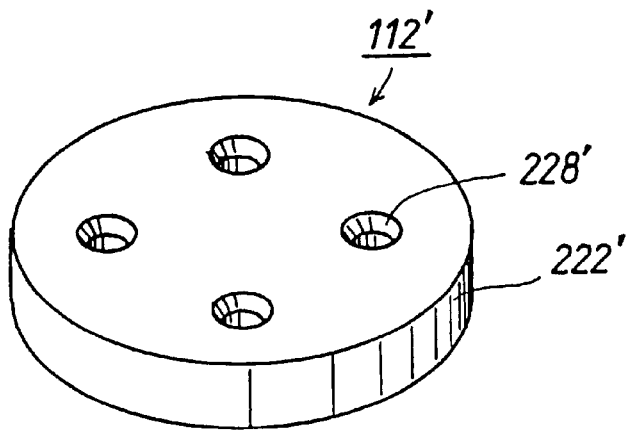
FIG. 11 is a schematic illustration showing a clamp, one example of support members related to this invention, and (a) is a perspective view and (b) a sectional view.
Figure 11B:
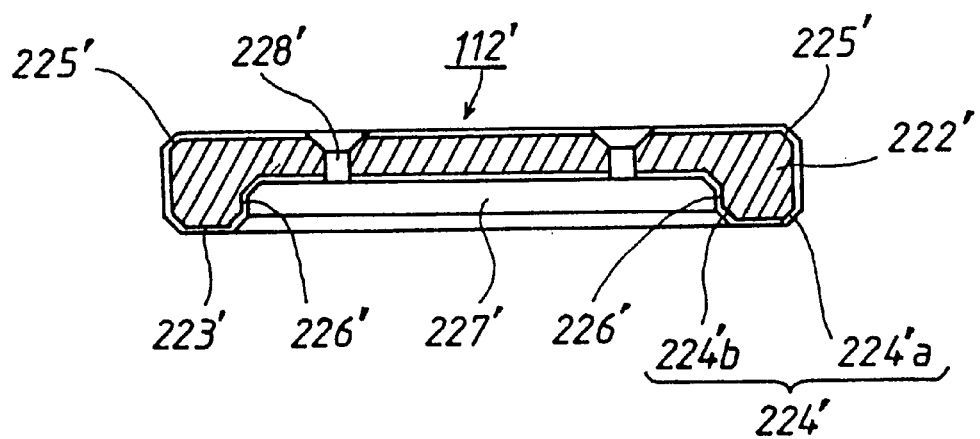

FIG. 9 to FIG. 11 are schematic illustration showing support members related to this invention, and FIG. 9 (a) is a perspective view showing a spacer 111 and (b) its sectional view, FIG. 10 (a) a perspective view showing a shim 110 and (b) its sectional view, and FIG. 11 (a) a perspective view showing a clamp 112' and (b) its sectional view. First, the spacer 111 shown in FIG. 9 is a ring 212 made of ceramics or glass, and to the inner and outer edges 214a, 214b, a taper surface (including surface C) or a curvature is formed. The contact surface 213 of this spacer 111 is finished to surface roughness of 0.1–2.0 $\mu$m in terms of center line average roughness (Ra) in order to prevent the fixed magnetic disk substrate from rolling as it rotates at high speed as well as the flatness of the contact surface 213 is finished to 3 $\mu$m or less to prevent deformation in the magnetic disk substrate when it is fixed, and in addition the parallelism of the top and bottom surfaces 213 is set to 5 $\mu$m or less so that the magnetic disk substrate is held to a specified position, And to the whole surface of the ring 212, conductive hard film 215 with volume specific resistance of $1 \times 10^7$ $\Omega \cdot$cm or lower is covered in the film thickness ranging from 0.1 to 3 $\mu$m.

The shim 110 is designed to be of the same profile as the spacer 111 as shown in FIG. 10 but slightly thinner.

The clamp 112' shown in FIG. 11 is a disk-shape plate 222' made of ceramics or glass, and at one surface center, an indent section 227' engaging to the top end part of the hub and a screw hole 228' for fixing to the hub are provided, and to the inner and to the outer edges 224'a and 224'b of the plate 222', the taper surface (including the face C) or curvature is formed.

The contact surface 223' of this clamp 112' is finished to surface roughness of 0.1–2.0$\mu$m in terms of center line average roughness (Ra) and the flatness of 3 $\mu$m or less to prevent deformation of the magnetic disk and to prevent rolling as in the case of the spacer 111. To the whole surface of this plate-type clamp 222', the conductive hard film 225' with the volume specific resistance $1 \times 10^7$ $\Omega \cdot$cm or less is covered in the film thickness ranging from 0.1 to 3 $\mu$m.

In this way, since in this invention, the base material composing the support member such as shims 110, spacers 111 and clamps 112' is formed with ceramics or glass, the contact surface 203, 213, 223' can be finished to remarkably high smoothness and excellent plane accuracy. Because in this invention, at least to the contact surface 203, 213, 223' and the inner wall surface 206, 216, 226', highly conductive hard film 205, 215, 225' is covered in the film thickness as thin as 0.1–3 $\mu$m, the surface with excellent wear resistance can be obtained without impairing flatness and parallelism of the contact surface 203, 213, 223'. Moreover, the conductive hard film 205, 215 225' provides the volume specific resistance $1 \times 10^7$ $\Omega \cdot$cm or less, static electricity charged to the magnetic disk substrate can be efficiently released, thereby preventing the recording contents from being destroyed.

For the conductive hard films 205, 115, 225', those with thermal expansion coefficient in the range of $2-10 \times 10^{-6}/°$ C. are preferable, and because the use of those conductive hard film 205, 115, 225' can approximate the thermal expansion coefficient to that of ceramics or glass ($4.0-10.0 \times 10^{-6}/°$ C.) which form the basic material, no deformation will be generated in magnetic disk substrate due to the heat caused by high-speed rotation.

In addition, in this invention, taper or R formed in inner and outer edges of each support member can prevent chipping at the time of clamping as well as secure the film thickness of conductive hard films 205, 115, 225' to be coated to the edges 204, 214, 224' and prevent disconnection.

Figure 12:
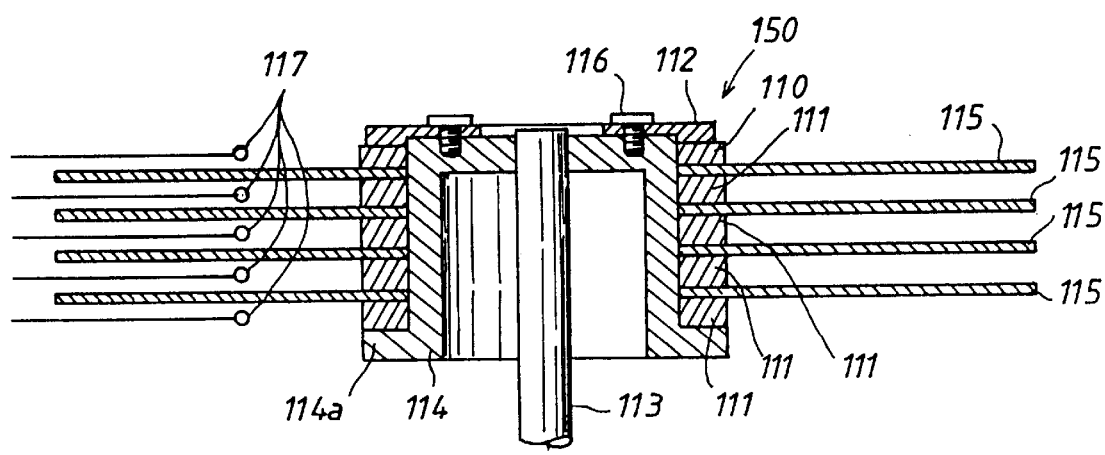
FIG. 12 is a longitudinal sectional view of a magnetic disk unit related to this invention.

Now, the magnetic disk unit 150 with the glass magnetic disk substrate 115 with magnetic film provided on the surface supported by these support members is shown in FIG. 12.

To the rotary shaft 113, a metal hub 114 in a nearly cylindrical profile equipped with a flange section 114a is fixed, and to the flange section 114a of the hub 114, a multiplicity of magnetic disk substrate 115 and spacer 111 shown in FIG. 9 are inserted alternately, and after lastly inserting the shim 110 shown in FIG. 9, they are retained with clamps 112 made of metal or ceramics such as alumina and the clamp 112 is tightened to the hub 114 with the screw 116 to fix the magnetic disk substrate 115.

The magnetic disk unit 150 according to this invention does not generate any inconvenience as a result of a thermal expansion difference even if temperature rises during high-speed rotation because the thermal expansion coefficient of the magnetic disk substrate 115 is approximate to that of the support member (spacer 111, shim 110). Consequently, the levitation rate of the magnetic head 117 with respect to the magnetic disk substrate 115 can be extremely reduced and the information recording density can be increased. Moreover, since the support member (spacer 111, shim 110) possesses the electric conductivity, static electricity charged in the magnetic disk substrate 115 can be released via the metallic hub 114 and rotary shaft 113 and the recording contents can be prevented from being destroyed.

For the magnetic disk substrate 115, in addition to glass substrate, the ceramic substrate on the surface of which a glass glazed layer is formed and the magnetic film is covered on the layer may be used.

In the magnetic disk unit 150 shown in FIG. 12, the magnetic disk substrates are supported between the top magnetic disk substrate 115 and the clamp 112 via the shim 110, but for other embodiment, it may be designed to support the clamp 112 by directly bringing it in contact with the top magnetic disk substrate 115, and in such event, the use of the clamp 112' shown in FIG. 11 can support the magnetic disk substrate 115 with high accuracy as well as can effectively release static electricity charged to the top magnetic disk substrate 115.

In addition, for another example of the magnetic disk unit 150, the spacer 111 arranged between the flange section 114a of the hub 114 and the magnetic disk substrate 115 may be removed and the magnetic disk substrate may be brought in direct contact with the hub flange, and in such event, in order to eliminate the thermal expansion difference with the magnetic disk substrate 115, a hub 114 made of ceramics or glass, on the surface of which the conductive ceramic film is covered, is recommended to use for increased effectiveness.

Now, for the base material constituting the support member such as the spacer 111, shim 110 and clamp 112, ceramics or glass with the thermal expansion coefficient $20 \times 10^{-6}/°$ C. or less and preferably $12 \times 10^{-6}/°$ C. can be used, and examples of ceramics include alumina ceramics, zirconia ceramics, silicon carbide ceramics, silicon nitride, $Al_2O_3$—TiC-based ceramics, forsterite ceramics, etc.

In particular, because these ceramics have the thermal expansion coefficient within the above-mentioned range as well as large specific rigidity, they hardly generate deformation at the time of clamping and can finish the contact surface 203, 231, 223' to remarkable smooth surface with excellent flatness accuracy.

Depending on the material of magnetic disk substrate 115, any ceramics with approximate thermal expansion coefficient may be chosen and applied from the material of the above-mentioned support members. For example, if the ceramic magnetic disk substrate 115 is used, ceramics with the thermal expansion coefficient $10 \times 10^{-6}/°$ C. or less should be used for support member, and similarly, when glass (thermal expansion coefficient 8.0–9×10$^{-6}$/° C.) magnetic disk substrate 115 is used, forsterite ceramics or glass with thermal expansion coefficient 8.0×10$^{-6}$/° C. or higher should be used for support member.

To the inner and outer edges 204, 214, 224' of the substrate member such as the spacer 111, shim 110 and clamp 112, a taper (including surface C) or curvature is formed to prevent chipping due to stress at the time of clamping, but the excessively small taper or curvature generate disconnection at the edge 204, 214, 224' to break continuity.

Consequently, in this invention, to the inner and outer edge 204, 214, 224' of the support member, the taper or curvature 0.04 mm or wider is formed.

That is, if the taper or curvature width formed on the edge 204, 214, 224' is smaller than 0.04 mm, since the edge 204, 214, 224' of the support member is a sharp edge as described before, thickness of the conductive hard film 205, 215, 225' coated to it decreases, possibly resulting in disconnection. However, because if the taper or curvature is 0.5 mm or wider, the contact area of the magnetic disk substrate 115 of the contact surface 203, 213, 223' becomes small and strain is generated in the magnetic disk substrate 115 at the time of clamping, it is desirable to form the taper or curvature in the range of 0.04 to 0.5 mm for the inner and outer edge 204, 214, 224' of the support member.

Figure 13:
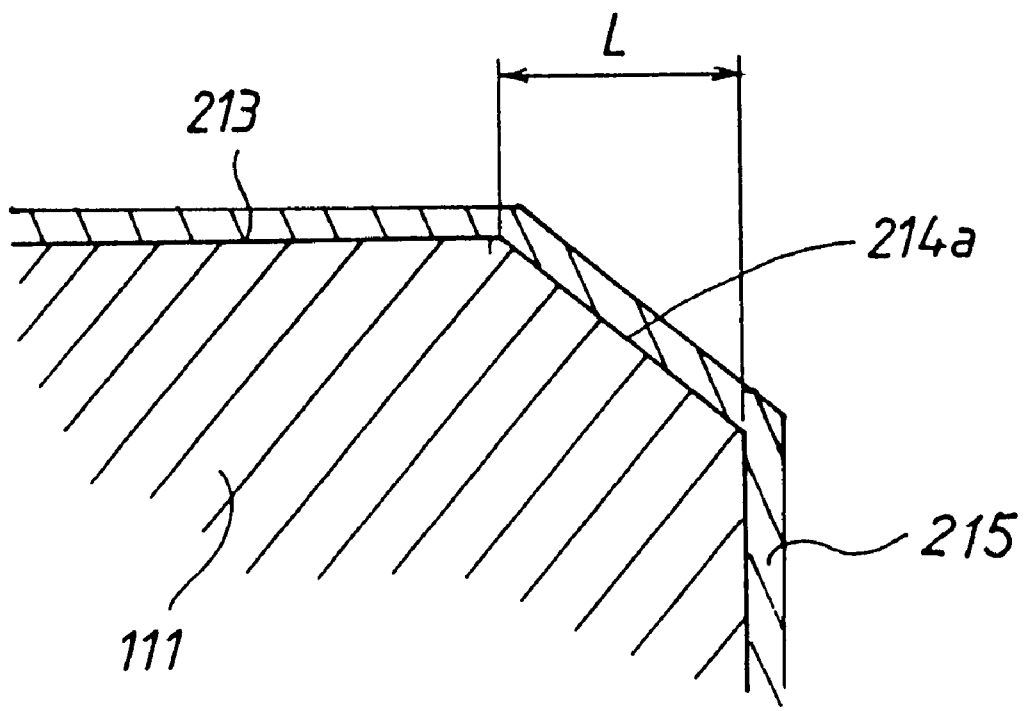
FIG. 13 is an enlarged view showing the main section A of FIG. 9.

The taper or curvature width referred to in this invention is the width L from the end face of the edge 214a on the contact surface side 213 as shown in the enlarged view of the main section A in FIG. 13 when description is made with the spacer 111 taken as an example.

Of these support members, at least contact surfaces 203, 213, 223 must be finished to surface roughness 0.1–2.0 $\mu$m in terms of center line average roughness (Ra). This is because if the center line average roughness (Ra) of the contact surfaces 203, 213, 223' is less than 0.1, the covered conductive hard film 205, 215, 225' is unable to be closely affixed with sufficient anchor effects as well as the surface of the conducive hard film 205, 215, 225 becomes excessively smooth, generating slips in the magnetic disk substrate 115 as high speed rotation is carried out, and conversely, if the center line average roughness (Ra) of contact surface 203, 213, 223' exceeds 2.0 $\mu$m, flatness of the magnetic disk substrate 115 will be impaired as well as damage the magnetic disk substrate 115.

On the other hand, examples of conductive hard film 205, 215, 225' for covering the support member include TiC, TiN, ZrN, HfC, TaC, ZrC, WC, VC, NbC, TiB$_2$, ITO (Indium Tin Oxide), and DLC (Diamond-like Carbon), and any one of these films is preferable.

These conductive hard films 205, 215, 225' has the volume specific resistance less than 1×10$^{-7}$·cm as shown in Table 4, the static electricity charged in the magnetic disk substrate 115 can be effectively removed. Moreover, because the thermal expansion coefficient is about 2–10× 10$^{-6}$/° C. which is equivalent to or approximate to that of the ceramics or glass composing the support member and the ceramics or glass composing the magnetic disk substrate 115, conductive hard film 205, 215, 225' is free from peeling or deformation due to heat as a result of high-speed rotation and the magnetic disk substrate 115 can be supported with extremely high flatness accuracy. Of the conductive hard films 205, 215, 225', ITO (Indium Tin Oxide) means In 203 with Sn doped, and DLC (Diamond-like Carbon) means carbon with the amorphous structure. The DLC may have an amorphous structure containing Si with Zr or W doped.

However, it is important to provide the film thickness of the conductive hard film 205, 215, 225' to be covered in the range from 0.1 to 3.0 $\mu$m.

This is because there is a fear of wear to be generated even in high-hardness conductive hard film 205, 215, 225' if the film thickness is less than 0.1 $\mu$m, and conversely, if the film thickness becomes thicker than 3.0 $\mu$m, it is unable to keep the flatness of the contact surface 203, 213, 223' to 3 $\mu$m or less.

The conductive hard film 205, 215, 225' may be formed by the general film forming means such as PVD or CVD processes but when the conductive hard film 205, 215, 225' is applied to the glassy support member, the use of the PVD process that enables low-temperature film forming is the most suitable because it will not impair smoothness of the support member.

TABLE 4

| Conductive ceramic film | Thermal expansion coefficient (× 10$^{-6}$/° C.) | Volume specific resistance (× 10$^{-4}$ Ω · cm) | Micro Vickers hardness (kg/mm$^2$) |
| --- | --- | --- | --- |
| TiC | 7.95 | 1.05 | 3170 |
| TiN | 9.35 | 0.217 | 2050 |
| HfC | 6.80 | 1.95 | 2530–3200 |
| TaC | 7.09 | 0.3 | 1720 |
| ZrC | 7.O1 | 0.7 | 2950 |
| VC | 7.25 | 1.56 | 2480 |
| NbC | 7.21 | 0.74 | 2170 |
| WC | 6.2 | 0.12 | 1716 |
| ZrN | 7.24 | 0.136 | 1670 |
| TiB2 | 4.60 | 0.12–0.284 | 3370 |
| ITO | — | 10.0 | — |
| DLC | 3.0–5.0 | 10$^{-5}$–10$^6$ | 3000–6000 |

EXPERIMENTAL EXAMPLE 1

Now, a spacer 111 shown in FIG. 9 is prepared and adhesion and flatness of the conductive hard film 215 were measured with surface roughness of the contact surface 213 of the spacer 111 varied.

For the measuring method, the contact surface 213 of the spacer with roughness varied, respectively, was coated with 1-$\mu$m-thick TiN film and the flatness was measured, and at the same time, cellophane tape was affixed to the TiN film, and adhesion was measured by determining whether peeling of the film occurred when the cellophane tape was pulled.

In this experiment, the film which does not generate peeling and achieves the flatness 3 $\mu$m or less is regarded to be superior.

The surface roughness of the contact surface 213 and the results are shown in Table 5.

TABLE 5

| No. | Centerline average roughness of contact surface ($\mu$m) | Flatness when 1-$\mu$m Thick TiN film is coated ($\mu$m) | Any sign of peeling | Overall rating |
| --- | --- | --- | --- | --- |
| 1 | 0.05 | 1 | Present | X |
| 2 | 0.1 | 1 | None | o |
| 3 | 0.5 | 1 | None | o |
| 4 | 1.0 | 1.5 | None | o |
| 5 | 2.0 | 3.0 | None | o |
| 6 | 3.0 | 3.8 | None | X |

As clear from Table 5, for sample No. 1, the TiN film thickness is thin enough to achieve the flatness of 3 $\mu$m or less but because surface roughness is less than 0.1 $\mu$m in terms of center line average roughness (Ra), the TiN film was easily peeled.

Sample No. 6 provided the surface roughness as big as 3.0 $\mu$m in terms of center line average roughness (Ra) and did not cause peeling of the TiN film, but the surface roughness of the contact surface 213 was too coarse to achieve flatness 3 μm or less.

Conversely, sample No. 2–5 according to this invention provided surface roughness in the range of 0.1–2.0 μm in terms of center line average roughness (Ra) and did not generate any film peeling and were able to achieve flatness 3 μm or lower and satisfied the standard.

EXPERIMENTAL EXAMPLE 2

Next, the spacer 111 of FIG. 9 with varying thickness of conductive hard film 215 was prepared and flatness of the spacer 111 and adhesion of the conductive hard film 215 were measured.

The measuring method was same as that used for Experimental Example 1 in which the TiN film was covered to the contact surface 213 of the spacer 111 as the conductive hard film 215 and the flatness was assumed and at the same time cellophane tape was affixed to the TiN film and was pulled to determine any sign of peeling of the film. However, the surface roughness of the contact surface 212 was 0.2 μm in terms of center line average roughness (Ra) and the flatness was 1 μm.

In this experiment, the space which does not generate any film peeling and achieves the flatness 3 μm or less is regarded to be superior.

The surface roughness of the contact surface 215 and the results are shown in Table 6.

TABLE 6

| | Centerline average roughness of contact surface (μm) | Flatness when 1-μm Thick TiN film is coated (μm) | Any sign of peeling | Overall rating |
|---|---|---|---|---|
| A | 0.05 | 1 | Present | x |
| B | 0.1 | 1 | None | ○ |
| C | 0.5 | 1.2 | None | ○ |
| D | 1.0 | 2.5 | None | ○ |
| E | 2.0 | 2.9 | None | ○ |
| F | 3.0 | 3.0 | None | ○ |
| G | 4.0 | 3.0 | None | x |

As clear from Table 6, for sample A, the TiN film thickness was as thin as 0.05 μm and was able to achieve the flatness of 3 μm or less but satisfactory adhesion strength was unable to be obtained and peeling of TiN film occurred.

Sample G provided the film thickness as big as 4.0 μm with variations as well as flatness 3.6 μm and was unable to achieve flatness 3 μm or lower.

Conversely, sample B–F according to this invention provided film thickness in the range of 0.1–2.0 μm and did not generate any film peeling and were able to suppress flatness of support member to 3.0 μm or lower.

EXPERIMENTAL EXAMPLE 3

In addition, measurement was made on the continuity when the width L of surface C formed on the edge portion 214 of the spacer 111 was varied.

The surface roughness of the contact surface 213 was 0.2 μm in terms of center line average roughness (Ra) and the TiN film was covered to the whole surface of the spacer 111 in 1.0 μm thick for conductive hard film 215. And the continuity from the contact surface 213 to the inner circumferential surface 216 was confirmed.

The relevant results are shown in Table 7.

TABLE 7

| Width L of surface C (mm) | Any sign o continuity |
|---|---|
| 0 | X |
| 0.01 | X |
| 0.02 | X |
| 0.03 | X |
| 0.04 | ○ |
| 0.05 | ○ |
| 0.06 | ○ |

As clear from Table 7, because the chamfering rate was small even if surface C treatment was performed on the edge portion 214 when the width L of surface C was 0.03 mm or less, the film thickness at this portion became thin and continuity was unable to be obtained, but continuity was obtained when the width L of surface C exceeded 0.04 mm. This indicates that the width L of surface C formed on the inner and outer edge portions 214 of the support member should be 0.04 mm or more.

In this experiment, an example in which surface C was formed on the edge portion 214 of the spacer 111 was shown but the same results were obtained with the taper or curvature.

As described above, this invention can efficiently release static electricity charged on the magnetic disk substrate and scarcely causes wear in the contact surface by providing the taper or curvature 0.04–0.5 mm wide on the inner and outer edges of the support members such as shims, clamps, and spacers composed with ceramics or glass and coating 0.1–3 μm thick conductive hard film on the contact surface with magnetic disk substrate and on the inner circumferential surface. Moreover, in this invention, since one type of TiC, TiN, ZrN, HfC, TaC, ZrC, WC, VC, NbC, TiB$_2$, ITO, DLC is coated as the conductive hard film, it is able to achieve the same or approximate thermal expansion coefficients for support member and and magnetic disk substrate, generating no peeling of film due to heat resulting from high-speed rotation, and as a result, no strain is generated in the magnetic disk substrate, and therefore, the magnetic disk substrate can be supported with remarkably high flatness accuracy.

In this invention, since the magnetic disk unit is configured by supporting one or a plurality of magnetic disk substrate made of ceramics or glass via support members, which are formed in a ring made of ceramics or glass and are provided with 0.04–0.5 mm wide taper or curvature on the inner and outer edges and have at least the contact surface with the magnetic disk substrate and inner circumferential surface coated with conductive hard film 0.1–3 μm thick, to the hub fixed to a rotary shaft and made of conductive material, the levitation rate of the magnetic head with respect to the magnetic disk substrate can be reduced to a minimum, thereby enabling high-density recording (increased capacity) and efficient releasing of static electricity charged in the magnetic disk substrate via support members and the hub, and preventing recording contents from being destroyed.

Now, description will be made on embodiments of this invention.

Figure 14A:
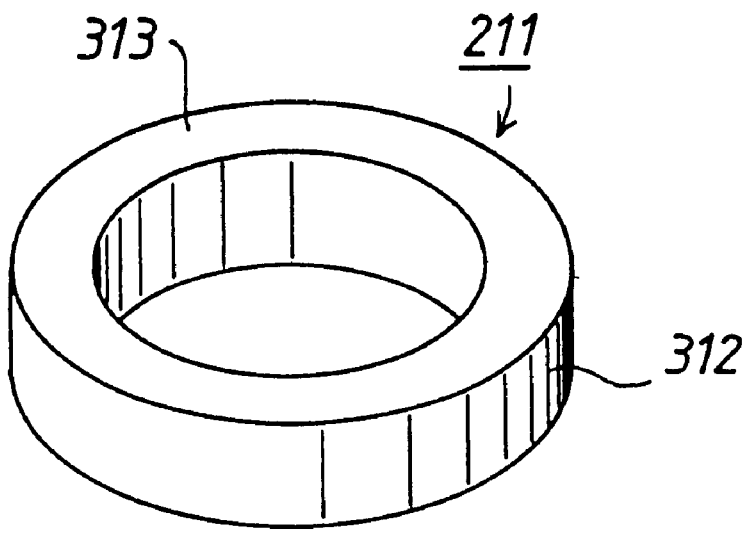
FIG. 14 is a schematic illustration showing a spacer, one example of support members related to this invention, and (a) is a perspective view and (b) a sectional view.
Figure 14B:
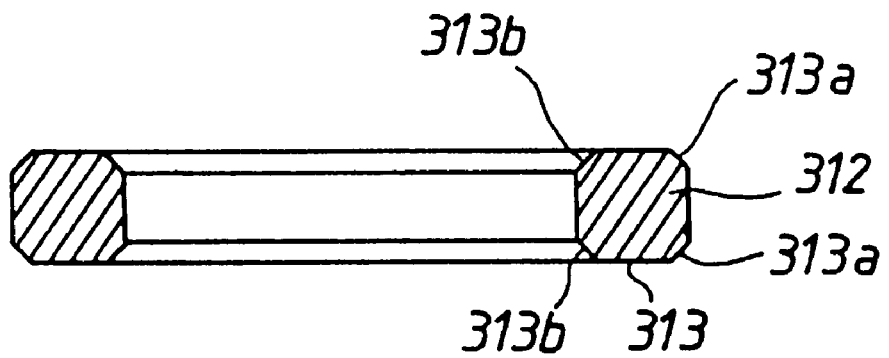
Figure 15A:
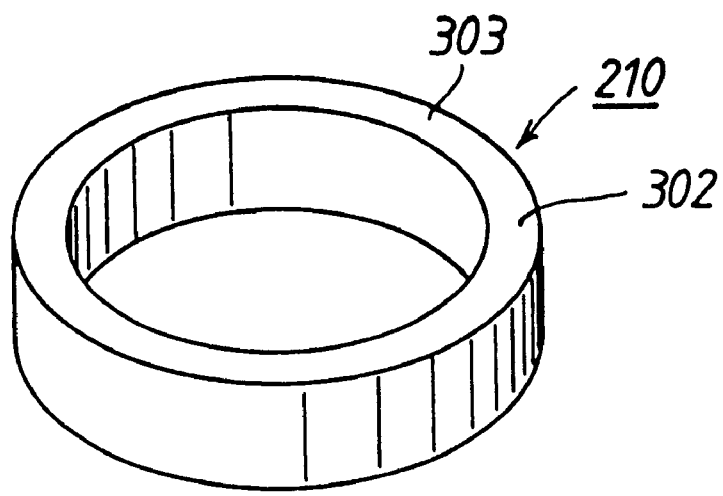
FIG. 15 is a schematic illustration showing a shim, one example of support members related to this invention, and (a) is a perspective view and (b) a sectional view.
Figure 15B:
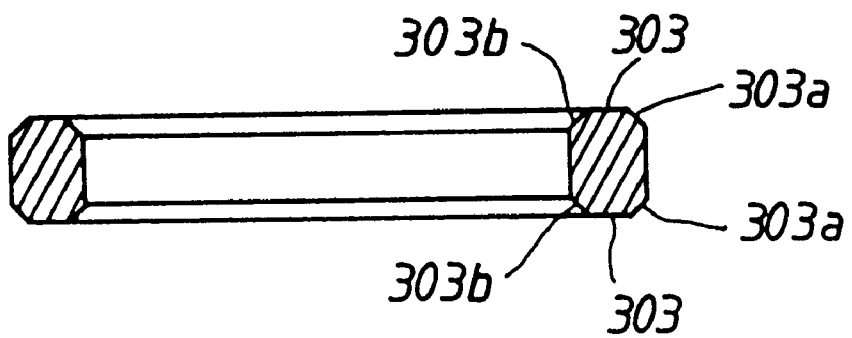
Figure 16A:
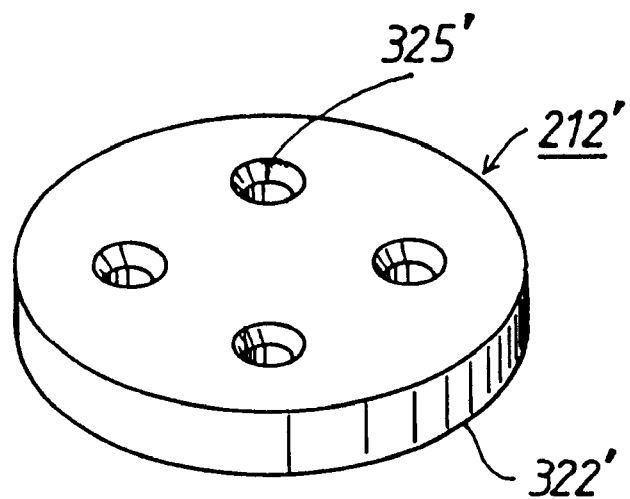
FIG. 16 is a schematic illustration showing a clamp, one example of support members related to this invention, and (a) is a perspective view and (b) a sectional view.
Figure 16B:
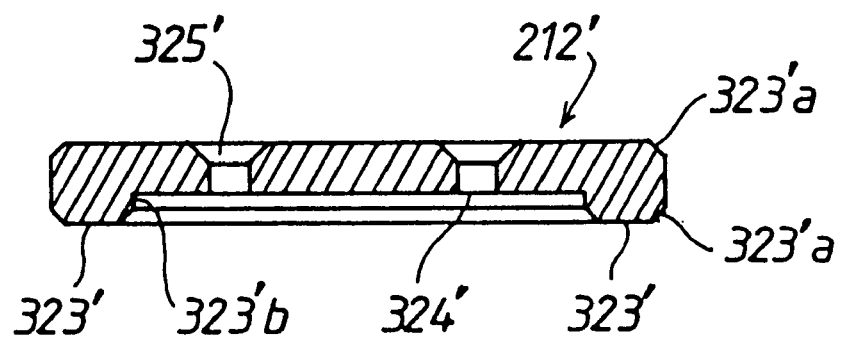

FIG. 14 to FIG. 16 are schematic illustrations showing support members related to this invention, and FIG. 14 (a) is a perspective view showing a spacer 211 and (b) its sectional view, FIG. 15 (a) a perspective view showing a shim 210 and (b) its sectional view, FIG. 16 (*a*) a perspective view showing a clamp 212' and (b) its sectional view.

First, the spacer 211 shown in FIG. 14 is a ring 312 made of forsterite ceramics with conductivity less than $10^7$ Ω·cm in terms of volume specific resistance, and to the inner and outer edges 313*a*, 313*b*, surface C or R is formed to prevent chipping.

The contact surface 313 is finished to surface roughness of 0.2–2.0 μm in terms of center line average roughness (Ra) in order to prevent the fixed magnetic disk substrate from rolling as it rotates at high speed as well as the flatness of the contact surface 313 is finished to 3 μm or less to prevent deformation in the magnetic disk substrate when it is fixed, and in addition the parallelism of the top and bottom surfaces 313 is set to 5 μm or less so that the magnetic disk substrate is held to specified intervals. The shim 210 is designed to be of the same profile as the spacer 211 as shown in FIG. 15 but slightly thinner.

The clamp 212' shown in FIG. 16 is a disk-shape plate 322' made of forsterite ceramics, and the contact surface 323' is finished to surface roughness of 0.2–2.0 μm in terms of center line average roughness (Ra) and the flatness of 3 μm or less to prevent deformation of the magnetic disk and to prevent rolling as in the case of the spacer 211. And at the center of the contact surface 323', and indent 324' for engaging with the hub tip end portion and a screw hole 325' for fixing to the hub are provided, and on the inner and outer edges 323'*a*, 323'*b* of the plate-type clamp 322', surface C or R is formed.

In this way, since in this invention, the base material composing the support member such as shims 210, spacers 211 and clamps 212' is formed with forsterite ceramics with volume specific resistance less than $10^7$ Ω·cm, static electricity charged in magnetic disk substrate can be efficiently released. In addition, because the forsterite ceramics composing the support member provides the same or approximate thermal expansion coefficient (8.0–10.0×$10^{-6}$/° C.) as that of ceramics or glass magnetic disk substrate, it can prevent deformation of magnetic disk substrate as a result of thermal expansion difference and can support the magnetic disk substrate with remarkable high accuracy.

Figure 17:
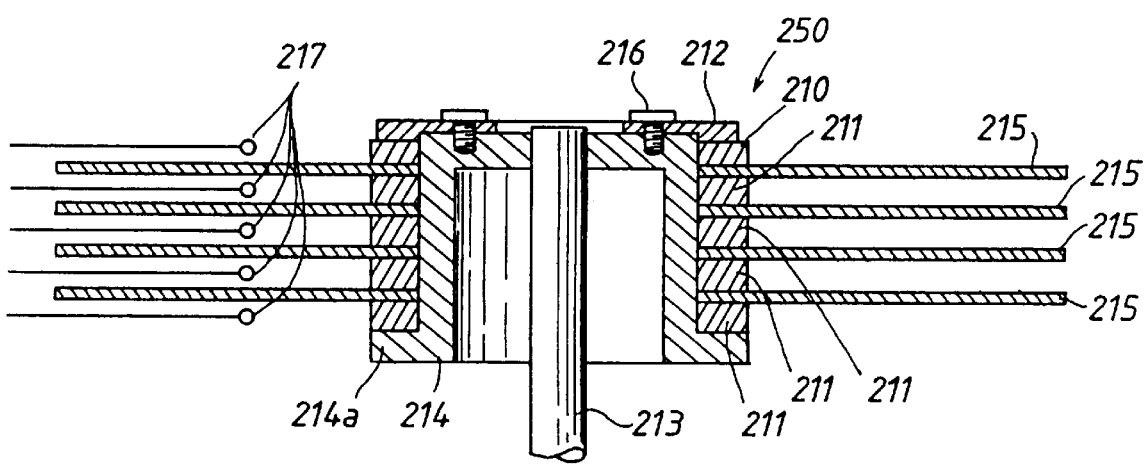
FIG. 17 is a longitudinal sectional view of a magnetic disk unit related to this invention.

Now, the magnetic disk unit 250 with the glass magnetic disk substrate 215 with magnetic film provided on the surface supported by these support members is shown in FIG. 17.

To the rotary shaft 213, a metal hub 214 in a nearly cylindrical profile 14 equipped with a flange section 214*a* is fixed, and to the flange section 214*a* of the hub 214, a multiplicity of magnetic disk substrate 215 and spacer 211 are inserted alternately, and after inserting the shim 210 shown in FIG. 15, they are retained with clamps 212 made of metal or ceramics such as alumina and the clamp 212 is tightened to the hub 214 with the screw 216 to fix the magnetic disk substrate 215.

The magnetic disk unit 250 according to this invention does not generate any inconvenience as a result of a thermal expansion difference even if temperature rises during high-speed rotation because the thermal expansion coefficient of the magnetic disk substrate 215 is same or approximate to that of the support member (spacer 211, shim 210). Consequently, the levitation rate of the magnetic head 217 with respect to the magnetic disk substrate 215 can be extremely reduced and the information recording density can be increased. Moreover, since the support member (spacer 211, shim 21) possesses the electric conductivity, static electricity charged in the magnetic disk substrate 215 can be released via the metallic hub 214 and rotary shaft 213 and the recording contents can be prevented from being destroyed.

For the magnetic disk substrate 215, those in which a glass glazed layer is formed on the ceramic substrate surface, on which the magnetic film is covered may be used in addition to glass substrate.

In the magnetic disk unit 250 shown in FIG. 17, the magnetic disk substrate 215 is supported by shims 210 intervening between the magnetic disk substrate 215 on the uppermost part and the clamp 212 but in addition to this, it may be designed to be supported by directly bringing the clamp 212 in contact with the magnetic disk substrate 215, and in this case, the use of the clamp 212' shown in FIG. 16 can achieve the accurate support of the magnetic disk substrate 215 as well as can effectively release static electricity charged in the uppermost magnetic disk substrate 215.

For other example of the magnetic disk unit 250, it may also be designed to remove the spacer 211 arranged between the flange section 214*a* of the hub 214 and the magnetic disk substrate 25 and support the magnetic disk substrate by bringing them in direct contact, and in this case, in order to eliminate the thermal expansion difference with the magnetic disk substrate 12, it is desirable to form the hub 214 with conductive ceramics, in particular, forsterite ceramics with electric conductivity.

By the way, the conductive forsterite ceramics which constitutes the support members such as spacer 211, shim 210 and clamp 212' is primarily composed of forsterite (2MgO·SiO$_2$) and has a metallic compound added as a conducting material, and in particular, those with iron-based compounds such as iron oxide (FeO, Fe$_2$O$_3$), triiron tetra oxide (Fe$_3$O$_4$), iron hydroxide oxide (FeO(OH)), etc. added as metallic compound are preferable.

That is, the inventors of this invention have earnestly made researches on the materials which has the conductivity less than $10^7$Ω·cm in terms of volume specific resistance and provides same or approximate thermal expansion coefficient of glass magnetic disk substrate 215, and as a result, have found that adding iron-based compounds such as iron oxide, triiron tetraoxide, iron hydroxide oxide, etc. to a certain range can provide electric conductivity with scarcely impairing the mechanical properties. In addition, forsterite ceramics containing iron compounds is difficult to generate chipping as compared to insulating forsterite ceramics and can reduce the volume of surface C or R at the edges (303*a*, 303*b*, 313*a*, 313*b*, 323*a*', 323*b*'). Consequently, since the ratio of the contact area of the contact surface (303, 313, 323') with the magnetic disk substrate 215 can be increased, the deformation of the magnetic disk substrate 215 can be suppressed.

The preferable dosage of the iron compound is 20–60 wt % to the total volume. This is because when the dosage is less than 20 wt %, the volume specific resistance exceeds $10^7$ Ω·cm and high insulation performance results, and it becomes unable to prevent charging of magnetic disk substrate, and conversely if the dosage is greater than 60 wt %, mechanical properties (Young's modulus, bending strength) are greatly reduced, and the flatness of the contact surfaces 303, 313, 323' of each support member is unable to be maintained and at the same time, the thermal expansion coefficient lowers, increasing the thermal expansion difference with the glass magnetic disk substrate 215 and generating deformation in magnetic disk substrate 215.

In the meanwhile, to fabricate the support member according to this invention, first of all, the ceramic raw material with MgO and SiO$_2$ mixed at a ratio of 50 to 50 is mixed and ground in a wet condition and dried to produce granules with MgO and SiO$_2$ finely and homogeneously dispersed, and then it is sintered to form ceramic particles with the crystal structure comprising 2MgO.SiO$_2$ and/or MgSiO$_3$.

Then, to 40–80 wt % of this ceramic particle, at least one or more types of iron oxide (FeO, Fe$_2$O$_3$), triiron tetra oxide (Fe$_3$O$_4$), iron hydroxide oxide (FeO(OH)) are added in the range of 20–60 wt % to the total together with a binder, and after blended and dried, the mixture is formed into a compact in a ring, cylindrical, or other desired shape by a mechanical press, and the compact is sintered for 1–2 hours at sintering temperature of 1200–1300° C. in atmosphere, and the support member according to this invention can be obtained.

In this ceramics, it is preferable that for the forsterite component, crystals of 2MaO.SiO$_2$ and/or MgSiO$_3$ exist and for iron-based compound components, crystals of one or more types of MgFe$_2$O$_3$, Fe$_3$O$_4$ exist. The existence of these crystals means that the peak of each crystal is determined by X-ray refraction analysis.

In the forsterite ceramics, impurities such as TiO$_2$, CaO, etc. may be included in the range of 15 wt % or less with respect to the total.

The support members comprising conductive forsterite ceramics obtained in this way provides the volume specific resistance less than $10^7$ $\Omega \cdot$cm, the thermal expansion coefficient in the range of $9–11 \times 10^{-6}$/° C. Young's modulus of 100–140 GPa, and bending strength of 10–14 kg/mm$^2$.

As described above, because the support member according to this invention can have the thermal expansion coefficient equivalent to or approximate to that of the magnetic disk substrate and provides electric conductivity, it does not cause any inconvenience related to the thermal expansion difference even if it acquires high temperature at the time of high-speed rotation and can release static electricity charged in the magnetic disk substrate 215. Moreover, if the magnetic disk unit according to this invention in which the glass magnetic disk substrates are supported using the above-mentioned support members is used, the levitation rate of the magnetic head 217 with respect to the magnetic disk substrate can be remarkably reduced and high density recording can be achieved and at the same time, destruction of recording contents resulting from magnetic disk 215 being charged can be prevented.

Experimental Example

Now, of the forsterite composing the support member according to this invention, the volume specific resistance, Young's modulus, bending strength, and thermal expansion coefficient were measured when the dosage of iron-based compounds (iron oxide (FE0, Fe$_2$0$_3$), triiron tetra oxide (Fe$_3$0$_4$)) was varied.

For the evaluation standard of this experiment, support members with volume specific resistance less than $10^7$ $\Omega \cdot$cm, Young's modulus of 100 GPa or higher, bending strength of 10 kg/mm$^2$ or higher, and the thermal expansion coefficient in the range of $9–11 \times 10^{-6}$/° C. were regarded as superior.

The results are shown in Table 8 to 10, respectively.

TABLE 8

| | Dosage (wt %) | | Sintering conditions | | Volume specific resistance | Young's modulus | Bending strength | Thermal expansion coefficient |
|---|---|---|---|---|---|---|---|---|
| No. | Forsterite | FeO | Temperature | Hours | ($\Omega \cdot$cm) | (GPa) | (kg/mm$^2$) | (1/° C.) |
| 1 | *100 | 0 | 1250 | 2 | $9 \times 10^{11}$ | 150 | 15.0 | $10 \times 10^{-6}$ |
| 2 | *85 | 15 | 1230 | 2 | $9 \times 10^{7}$ | 140 | 15.0 | $10 \times 10^{-6}$ |
| 3 | 80 | 20 | 1230 | 2 | $1 \times 10^{5}$ | 140 | 13.0 | $10 \times 10^{-6}$ |
| 4 | 75 | 25 | 1230 | 2 | $2 \times 10^{4}$ | 140 | 13.0 | $10 \times 10^{-6}$ |
| 5 | 65 | 35 | 1230 | 2 | $2 \times 10^{4}$ | 130 | 12.0 | $10 \times 10^{-6}$ |
| 6 | 55 | 45 | 1240 | 2 | $5 \times 10^{3}$ | 135 | 11.0 | $10 \times 10^{-6}$ |
| 7 | 45 | 55 | 1250 | 2 | $3 \times 10^{3}$ | 130 | 10.0 | $10 \times 10^{-5}$ |
| 8 | 40 | 60 | 1250 | 2 | $1 \times 10^{5}$ | 100 | 10.0 | $9 \times 10^{-6}$ |
| 9 | *35 | 65 | 1250 | 2 | $1 \times 10^{5}$ | 80 | 5.0 | $3 \times 10^{-6}$ |

*shows valued outside the range of this invention.

TABLE 9

| | Dosage (wt %) | | Sintering conditions | | Volume specific resistance | Young's modulus | Bending strength | Thermal expansion coefficient |
|---|---|---|---|---|---|---|---|---|
| No. | Forsterite | FeO | Temperature | Hours | ($\Omega \cdot$cm) | (GPa) | (kg/mm$^2$) | (1/° C.) |
| 11 | *85 | 15 | 1230 | 2 | $9 \times 10^{11}$ | 150 | 15.0 | $10 \times 10^{-6}$ |
| 12 | 80 | 20 | 1235 | 2 | $9 \times 10^{6}$ | 140 | 13.0 | $10 \times 10^{-6}$ |
| 13 | 75 | 25 | 1230 | 2 | $1 \times 10^{5}$ | 130 | 13.0 | $10 \times 10^{-6}$ |
| 14 | 65 | 35 | 1230 | 2 | $2 \times 10^{4}$ | 120 | 11.0 | $10 \times 10^{-6}$ |
| 15 | 55 | 45 | 1240 | 2 | $2 \times 10^{4}$ | 120 | 10.0 | $10 \times 10^{-6}$ |
| 16 | 45 | 55 | 1250 | 2 | $1 \times 10^{5}$ | 100 | 10.0 | $10 \times 10^{-6}$ |
| 17 | 40 | 60 | 1250 | 2 | $7 \times 10^{5}$ | 100 | 10.0 | $9 \times 10^{-6}$ |
| 18 | *35 | 65 | 1260 | 2 | $1 \times 10^{5}$ | 90 | 5.0 | $5 \times 10^{-6}$ |

*shows valued outside the range of this invention.

TABLE 10

| No. | Dosage (wt %) | | Sintering conditions | | Volume specific resistance | Young's modulus | Bending strength | Thermal expansion coefficient |
| --- | --- | --- | --- | --- | --- | --- | --- | --- |
| | Forsterite | FeO | Temperature | Hours | ($\Omega \cdot$ cm) | (GPa) | (kg/mm$^2$) | (1/° C.) |
| 21 | *85 | 15 | 1240 | 2 | $5 \times 10^{11}$ | 150 | 14.0 | $10 \times 10^{-6}$ |
| 22 | 80 | 20 | 1240 | 2 | $2 \times 10^{6}$ | 140 | 13.5 | $10 \times 10^{-6}$ |
| 23 | 75 | 25 | 1250 | 2 | $1 \times 10^{6}$ | 130 | 13.5 | $10 \times 10^{-6}$ |
| 24 | 65 | 35 | 1250 | 2 | $1 \times 10^{6}$ | 120 | 13.0 | $10 \times 10^{-6}$ |
| 25 | 60 | 40 | 1250 | 2 | $7 \times 10^{5}$ | 120 | 12.0 | $10 \times 10^{-6}$ |
| 26 | 55 | 45 | 1260 | 2 | $2 \times 10^{5}$ | 115 | 12.0 | $10 \times 10^{-6}$ |
| 27 | 50 | 50 | 1260 | 2 | $1 \times 10^{5}$ | 100 | 10.0 | $10 \times 10^{-6}$ |

*shows valued outside the range of this invention.

As a result, because in sample No. 1, 2, 11, 21, the dosage of iron-based compounds (iron oxide (FeO, Fe$_2$O$_3$), triiron tetra oxide (Fe$_3$O$_4$)) is less than 20 wt %, the volume specific resistance became $10^7$ $\Omega$·cm or higher and it was unable to provide electric conductivity necessary for support members.

In sample No. 9, 18, because the dosage of iron-based compounds (iron oxide (FeO, Fe$_2$O$_3$) was more than 60 wt %, the volume specific resistance become less than $10^7$ $\Omega$·cm but Young's modulus, bending strength, and thermal expansion coefficient did not satisfy the standard values.

Conversely, in sample No. 3–8, 12–17, and 22–27, because the dosage of iron-based compounds (iron oxide (FeO, Fe$_2$O$_3$), triiron tetra oxide (Fe$_3$O$_4$)) is within the range of 20–60 wt %, the volume specific resistance was less than $10^7$ $\Omega$·cm, Young's modulus 100 GPa or higher, bending strength 10 kg/mm$^2$ or higher, and thermal expansion coefficient within the range of 9–11×10$^{-6}$/° C., satisfying the standard values.

As described above, this invention can bring the thermal expansion coefficient of the support members such as shims, clamps, and spacers to the same or approximate level to that of magnetic disk substrate by forming the support members with forsterite ceramics with electric conductivity less than $10^7$ $\Omega$·cm in terms of volume specific resistance, thereby eliminating inconvenience caused by thermal expansion coefficient difference even when the support members acquire high temperature during high-speed rotation, and at the same time efficiently releasing static electricity charged in the magnetic disk substrate.

As described above, the magnetic disk unit is configured by inserting and fixing glass magnetic disk substrates successively to the hub made of conductive material using the support member, and it is therefore able to extremely minimize the levitation rate of the magnetic head with respect to the magnetic disk substrate, and high-density recording (increased capacity) can be achieved and at the same time static electricity charged in the magnetic disk substrate can be efficiently released via the support member and hub, and destruction of recording contents can be prevented.

Now description will be made on embodiments according to this invention.

Figure 18A:
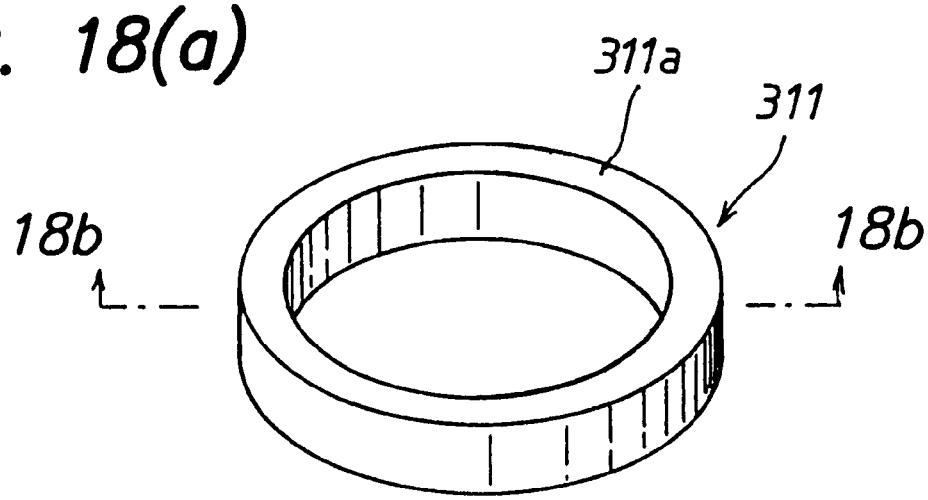
FIG. 18 is a schematic illustration showing a spacer, one example of support members for magnetic disk substrate related to this invention, and (a) is a perspective view and (b) a section taken on line X—X in (a)
Figure 18B:
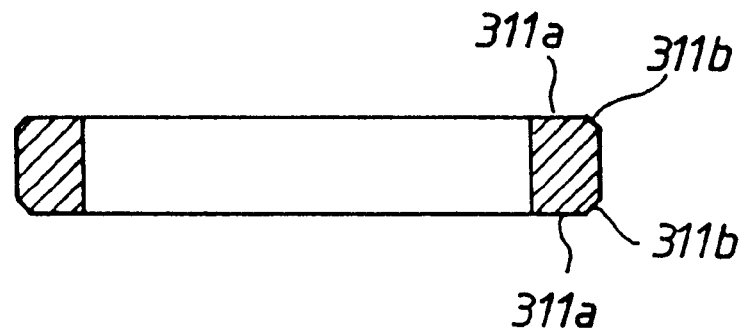

First of all, a spacer, one example of the support member of this invention is shown in FIG. 18. This spacer 311 is formed in a ring shape made of ceramics, and the contact surface 311a with the top and bottom magnetic disk substrates is finished to flatness 3 μm or less and a smooth surface 2.0 μm or less, and the parallelism of top and bottom contact surfaces 311a is kept 5 μm or lower. Each edge 311b is chamfered to surface C or R.

The shim, one example of support members of this invention is not illustrated, but is of the same profile as that of the spacer but is slightly thinner.

Figure 19A:
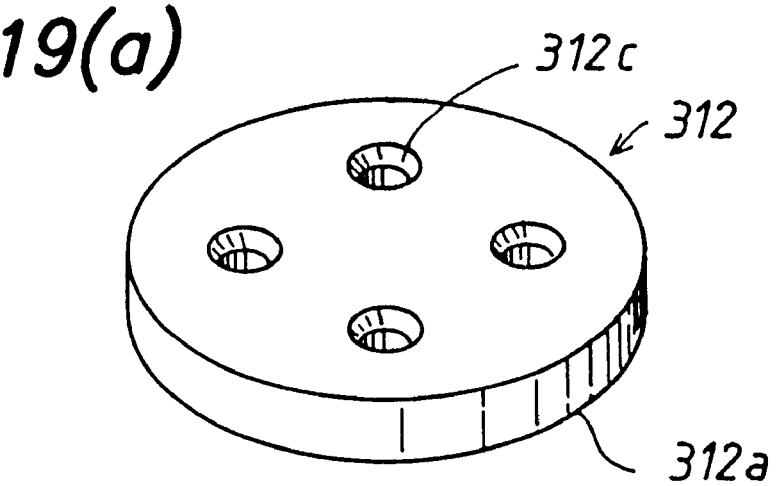
FIG. 19 is a schematic illustration showing a clamp, one example of support members for magnetic disk substrate related to this invention, and (a) is a perspective view and (b) a section taken on line Y—Y in (a)
Figure 19B:
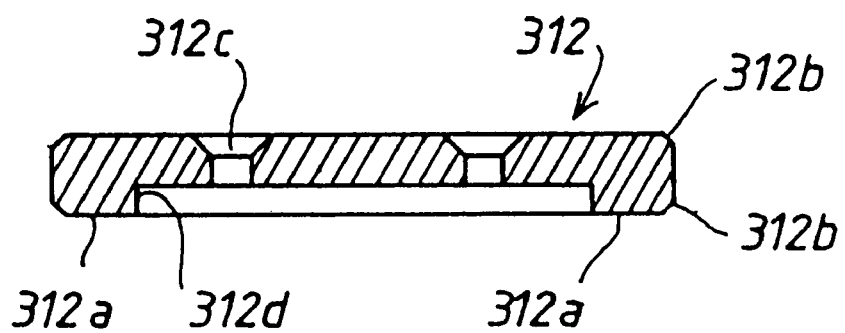

Next, the clamp, another example of support member is shown in FIG. 19. This clamp 312 is a plate type clamp made of ceramics and the contact surface 312a is finished to the flatness 3 μm or lower and the smooth surface with roughness of 2.0 μm or lower. The outer circumference edge 312b is chamfered to surface C or R and a screw hole 312b is provided for tightening. In addition, a stepped area 312d is provided for being engaged with the hub at the time of installation.

Figure 20:
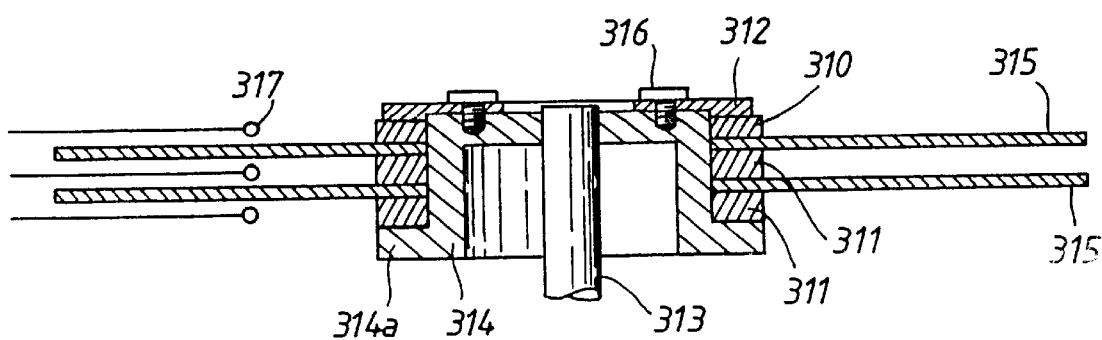
FIG. 20 is a sectional view of a magnetic disk unit related to this invention.

Now, the magnetic disk unit using these shims 310, spacers 311, and clamps 312 is shown in FIG. 20. To the flange portion 314a formed at the hub 314 connected to the rotary shaft 313, ceramic spacer 311 and magnetic disk substrate 315 are arranged alternately, and the top ends of these are retained with shims 310 and clamps 312 and tightened with screws 316, thereby tightening 2 to 8 pieces of magnetic disk substrate 315 are fixed as specified intervals. And with the magnetic head 317 levitating on the surface of the magnetic disk substrate 315 with a minimum distance kept while rotating the hub 314 and each of the magnetic disk substrates 315 by the rotary shaft 313, information is written into and read from the specified position.

For the magnetic disk substrate 315, in general, the aluminum substrate is used, but magnetic disk substrate with a glazed surface formed on the surface of the ceramics such as alumina and the magnetic film equipped on the glazed surface or the magnetic disk substrate completely formed with the glass substrate and the magnetic film equipped on the surface may be used. In addition, it is possible to use titanium, silicon, YAG, carbon, etc. for other substrate materials.

Because shims 310, spacers 311, and clamps 312, support members of this invention are made of high-rigidity ceramics, they are free from deformation at the time of clamping, and because the contact surface 311a, 312a is finished in the surface with flatness 3 μm or lower, each magnetic disk substrate 315 can be supported at a remarkably high accuracy.

In addition, if ceramic disk substrate made of ceramics or glass is used for the magnetic disk substrate 315, the thermal expansion ratio to shims 310, spacers 311, and clamps 312 become approximate one another, and no inconvenience resulting from thermal expansion difference will be generated even if they become high temperature during high-speed rotation. Consequently, it is possible to dramatically reduce the levitation rate of the magnetic head 317 with respect to the magnetic disk substrate and to increase the information recording-density.

In the example of FIG. 20, the clamp 312 is designed to support the magnetic disk substrate 315 via the shim 310 but in addition to this, it may be designed to support the magnetic disk substrate by directly coming in contact with the top magnetic disk substrate 315. It may also be designed to bring the hub 314 in contact with the magnetic disk substrate 315 to support. In such event, it is desirable to form the hub 314 with ceramics or glass.

Now, for the materials composing the support member such as shim 310, spacer 311, and clamp 312, it is possible to use ceramics or glass whose thermal expansion coefficient is $20 \times 10^{-6}/°$ C., and more preferably $12 \times 10^{-6}/°$ C. or less, but for ceramics, as the characteristics are shown in Table 11, alumina ceramics, zirconia ceramics, silicon carbide ceramics, silicon nitride ceramics, alumina-titanium carbide based ceramics, barium titanate, cermet, forsterite ceramics, and others can be used.

Alumina ceramics in Table 11 is a sintered material which contains 90 wt % $Al_2O_3$ and the remainder comprising $SiO_2$, MgO, CaO, etc. The conductive alumina ceramics is a sintered material which contains 70–80 wt % $Al_2O_3$ and the remainder comprising 10–20 wt % $TiO_2$ as a conductivity provider, and the conductive alumina ceramics sintered in the oxidizing atmosphere provides $10^8$ $\Omega \cdot cm$ volume specific resistance and that sintered in the reducing atmosphere provides $10^3$–$10^6$ $\Omega \cdot cm$ volume specific resistance.

Zirconia ceramics primarily consists of $ZrO_2$ and is partially stabilized zirconia ceramics in which the tetragonal phase is 80 mol % or higher by containing stabilizers such as $Y_2O_3$, CaO, MgO, etc.

In addition, silicon carbide ceramics contains more than 90 wt % SiC and the remainder comprising carbon (C) and boric acid (B), or $Al_2O_3$, $Y_2O_3$, etc., while silicon nitride ceramics contains more than 90 wt % $Si_3N_4$ and the remainder comprising $Al_2O_2$, $Y_3O_3$, etc.

The alumina-titanium carbide based ceramics is a sintered material primarily composed of 20–80 wt % $Al_2O_3$ and 80–20 wt % TiC and provides high hardness and electric conductivity. In addition, barium titanate is primarily composed of 10–20 mol % BaO and 90–80 mol % $TiO_2$, and contains at least one type of metallic oxide chosen from Al, Si, Zr, Nb, and Sr at a ratio of 0.01–4.0 parts in weight to 100 parts in weight of the main component, and is fired in the reducing atmosphere.

Cermet is a composite sintered material comprising a ceramic component which forms a hard phase and a metal component which forms a binder phase, and in particular cermet composed of 10–90 wt % TiC and 5–90 wt % TiN, and containing a 5a group metal carbide as an additive and iron group metal as a binder phase is used.

In addition, forsterite ceramics is a sintered material primarily composed of 2 $MgO \cdot SiO_2$ and because the Vickers hardness is as low as 1000 $kg/mm^2$ or lower, forsterite ceramics can be used to prevent damage to magnetic disk substrate 315.

Comparison of the properties of these ceramics with aluminum (metal) used as a comparison example indicates that as clear from Table 11, all these ceramics are difficult to deform at the time of tightening because of their high Young's modulus 13000 $kg/mm^2$ or higher and also difficult to generate inconvenience at the time of high temperature because their thermal expansion ratio is as small as $12 \times 10^{-6}/°$ C.

Furthermore, since materials such as conductive alumina ceramics, silicon carbide ceramics, alumina-titanium carbide ceramics, barium titanate, cermet, and the like provide the electric conductivity with the volume specific resistance $10^6$ $\Omega \cdot cm$ or lower, they can allow static electricity in magnetic disk substrate 315 to escape. The silicon nitride ceramics does not possess electric conductivity but by allowing it to contain a conductivity provider such as Ti to contain, the volume specific resistance can be lowered to $10^6$ $\Omega \cdot cm$ or less, and it is more suited to use these conductive silicon nitride ceramics.

TABLE 11

|  | Specific gravity | Young' modulus (kg/mm$^2$) | Vickers hardness (kg/mm$^2$) | Thermal conductivity × $10^{-6}/°$ C. | Volume specific resistance $\Omega \cdot cm$ |
| --- | --- | --- | --- | --- | --- |
| Alumina | 2.7 | 7200 | 65 | 24.2 | $10^{-8}$ |
| Alumina ceramics | 3.5–4.0 | 25000–40000 | 1200–1800 | 6.5–8.0 | $10^{13}$–$10^{15}$ |
| Conducive alumina | 3.5–4.0 | 25000–40000 | 1000–1200 | 6.5–8.0 | $10^3$–$10^8$ |
| Zriconia ceramics | 5.5–6.0 | 20000–26000 | 1200–1400 | 9.5–11.5 | $10^{13}$–$10^{15}$ |
| Silicon carbide ceramics | 2.8–3.5 | 35000–45000 | 2300–2500 | 3.5–4.5 | $10^2$–$10^6$ |
| Silicon nitride ceramics | 2.8–3.5 | 30000–35000 | 1400–1600 | 2.5–3.5 | $10^{13}$–$10^{15}$ |
| Alumina-titanium carbide ceramics | 4.0–4.5 | 40000–45000 | 1850–1950 | 6.5–8.0 | $10^{-2}$–$10^{-1}$ |
| Barium titanate | 4.0–4.5 | 17000–20000 | 1500–1900 | 8.0–10.0 | $10^2$–$10^6$ |
| Cermet | 5.5–7.5 | 40000–50000 | 1400–1800 | 7.0–8.0 | $10^{-4}$–$10^{-1}$ |
| Forsterite ceramics | 2.7–3.1 | 13000–16000 | 700–1000 | 8.0–12.0 | $10^{14}$– |

For glass as the material composing the support member of this invention, general sheet glass whose characteristics are shown in Table 12 or various glasses shown in Table 13 may be used.

TABLE 12

| | | |
| --- | --- | --- |
| Composition (%) | $SiO_2$ | 70–73 |
| | $Al_2O_3$ | 1.0–1.8 |
| | $Fe_2O_3$ | 0.08–0.14 |
| | CaO | 7–12 |
| | MgO | 1.0–4.5 |
| | $R_2O$ | 13–15 |
| Specific gravity | | about 2.5 |
| Bending strength | | about 5 $kgf/mm^2$ |
| Young's modulus | | 7300 $kgf/mm^2$ |
| Poison's ratio | | 0.23 |
| Hardness | Moh's | about 6.5 |
| | Vickers | 548 $kgf/mm^2$ |
| Compressive strength | | 60–120 $kgf/mm^2$ |
| Specific heat | | 0.13 $cal/g°$ C. (0–50° C.) |

TABLE 12-continued

| | | |
|---|---|---|
| | SiO$_2$ | 70–73 |
| | Al$_2$O$_3$ | 1.0–1.8 |
| | Fe$_2$O$_3$ | 0.08–0.14 |
| | CaO | 7–12 |
| Composition | MgO | 1.0–4.5 |
| (%) | R$_2$O | 13–15 |
| Thermal conductivity | 0.02 cal/cm sec ° C. (0° C.) | |
| Thermal expansion coefficient | 8.5 × 10$^{-6}$/° C. (20–350° C.) | |
| Softening point | 720–730° C. | |
| Refraction index | about 1.52 | |
| Reflectance | about 4% | |

TABLE 13

| Glass system | Thermal expansion coefficient (× 10$^{-6}$/° C.) |
|---|---|
| PbO · ZnO · B$_2$O$_2$ system | 7.0–8.0 |
| PbO · B$_2$O$_3$ system | 7.0–9.0 |
| Na$_2$O · BaO · SiO$_2$ system | 8.5–11.0 |
| Na$_2$O · Al$_2$O$_3$ · BaO · SiO$_2$ system | 7.0–10.0 |
| PbO · B$_2$O$_3$ · SiO$_2$ system | 7.5–9.5 |
| Na$_2$O · B$_2$O$_3$ · ZnO system | 7.0–8.0 |
| K$_2$O · PbO · SiO$_2$ system | 8.0–9.5 |
| Na$_2$O · K$_2$O · PbO · SiO$_2$ system | 8.0–10.0 |
| K$_2$O · BaO · SiO$_2$ system | 9.0–10.0 |

And the material with the approximate thermal expansion ratio should be used in accord with the material of the magnetic disk substrate 315. For example, if ceramic magnetic disk substrate 315 is used, ceramics with thermal expansion ratio 10×10$^{-6}$/° C. or lower in Table 11 should be used as support member, and similarly, when glass (thermal expansion ratio 8.0–9.0×10$^{-6}$/° C.) magnetic disk substrate is used, it is most suitable that ceramics such as forsterite, etc. with thermal expansion ratio 8×10$^{-6}$/° C. or higher in Table 12 and 13 should be used as support member.

In the support member of this invention, it is important to keep the flatness of contact surface 311a, 312a to 3 μm or lower and preferably 1 μm or lower and more suitably 0.3 μm or lower, and providing the contact surface 311a, 312a with this kind of excellent flatness enables accurate positioning of each magnetic disk substrate 315 as well as further high-density recording. In addition, with the same reasons, the parallelism between the top and the bottom contact surfaces 311a, 312a should be 5 μm or lower and preferably 3 μm or lower.

Figure 21:
FIG. 21 is an enlarged sectional view comparing the surface condition of ceramic material to metal material.
Figure 21:

For example, in order to achieve the 3-μm or lower parallelism between the contact surfaces 311a, 312a of the support member comprising the said ceramic materials, using a double-end grinding machine or polishing machine, the ceramic material should be ground or polished with diamond tools or diamond abrasive grains, and with the ceramic material with high rigidity, it is possible to achieve the flatness and parallelism 3 μm or lower, and preferably 1 μm or lower, and more suitably 0.3 μm or lower. In addition, the surface roughness (Ra) of the ceramic material can be made 2.0 μm or lower and as its surface condition is shown in comparison with that of the metallic materials in FIG. 21, since the surface of the ceramic material is free from any protrusion and only dent exists, the surface has no detrimental effect on the magnetic disk substrate 315 in contact with this surface.

Figure 22:
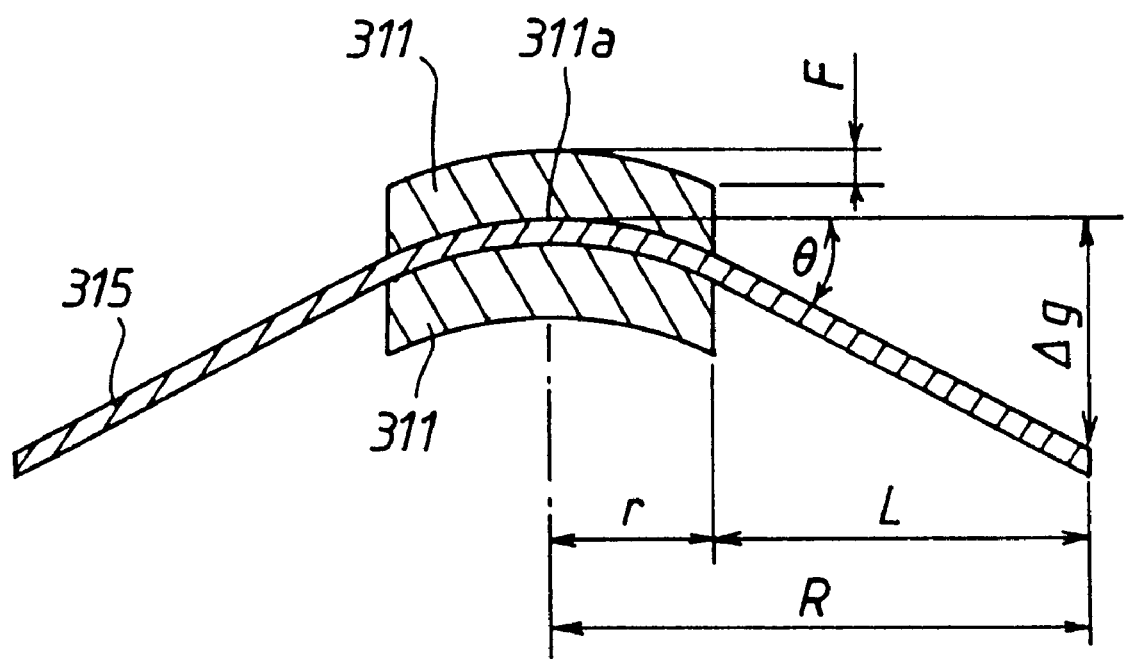
FIG. 22 is a schematic illustration showing a bend of the magnetic disk substrate in the magnetic disk unit according to the invention.

Now, the flatness of the contact surface 311a of the spacer 311 was varied and the displacement at the peripheral area of the magnetic disk substrate 315 when supported with this spacer 311 was determined. As shown in FIG. 22, when the maximum deflection occurs with the magnetic disk substrate 315 with radius R supported using the spacer 311 with flatness F of the contact surface 311a in radius r, the camber angle of the magnetic substrate is expressed by $$\theta = \tan^{-1}(2Fr/r^2 - F^2)$$

and if L=R−r, the displacement rate Δg at the peripheral area of the magnetic disk substrate is expressed as $$\Delta g = L \tan \theta + F = (2Fr/(r^2 - F^2)) L + F.$$

Now let r=11.53 mm and L=20.97 mm and change the value of flatness F, then we have Δg as shown in Table 14. As clear from Table 14, Δg can be remarkably minimized by bringing the flatness F to 3 μm or lower and preferably 1 μm or lower.

TABLE 14

| Flatness F (μm) | Δg (μm) |
|---|---|
| 5 | 23.1 |
| 3 | 13.9 |
| 1 | 4.6 |
| 0.1 | 1.3 |

In this way, according to this invention, by forming the support member such as shims, spacers, and clamps with ceramics or glass with thermal expansion ratio 20×10$^{-6}$/° C. or lower and preferably 12×10$^{-6}$/° C. or lower and designing the flatness of the surface in contact with the magnetic disk substrate to be 3 μm or lower, the magnetic disk substrate can be supported at high accuracy and the levitation rate of the magnetic head can be reduced to 0.1 μm or lower, and higher density recording is enabled.

If this substrate member is combined with ceramics or glass magnetic substrate to form a magnetic disk unit, the thermal expansion ratio of the support member coincides with that of the magnetic disk substrate, and therefore, it is possible to provide a magnetic disk unit with various features including such that deformation of the magnetic disk substrate or loose tightening can be prevented even if high temperature is acquired during application.

Now description will be made on embodiments according to this invention.

Figure 23A:
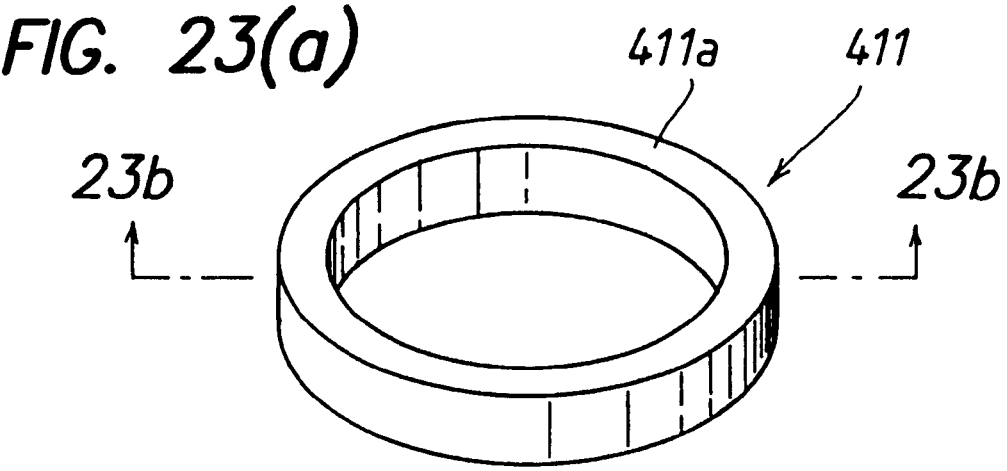
FIG. 23 is a schematic illustration showing a spacer, one example of support members for magnetic disk substrate related to this invention, and (a) is a perspective view and (b) a section taken on line X—X in (a)
Figure 23B:
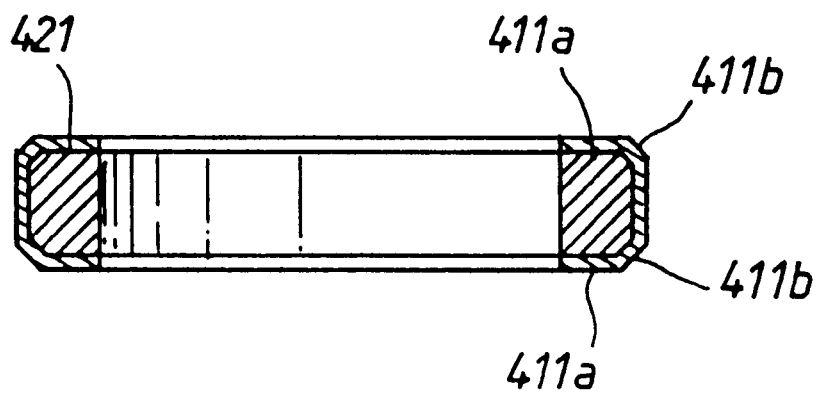

First of all, a spacer, one example of the support member of this invention is shown in FIG. 23. This spacer 411 is formed in a ring shape made of ceramics, the surface of which the film 421 with hardness 450kg/mm$^2$ or lower is equipped, and the contact surface 411a with the top and bottom magnetic disk substrates is finished to flatness 5 μm or less and a smooth surface 2.0 μm or less in terms of surface roughness (Ra), and the parallelism of top and bottom contact surfaces 411a is kept 5 μm or lower. Each edge 411b is chamfered to surface C or R.

The shim, one example of support members of this invention is not illustrated, but is of the same profile as that of the spacer 411 but is slightly thinner.

Figure 24A:
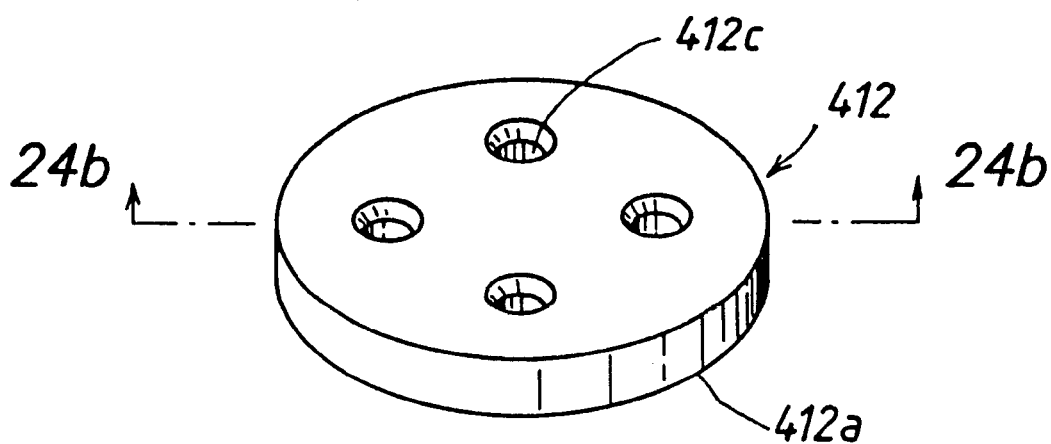
FIG. 24 is a schematic illustration showing a clamp, one example of support members for magnetic disk substrate related to this invention, and (a) is a perspective view and (b) a section taken on line Y—Y in (a)
Figure 24B:
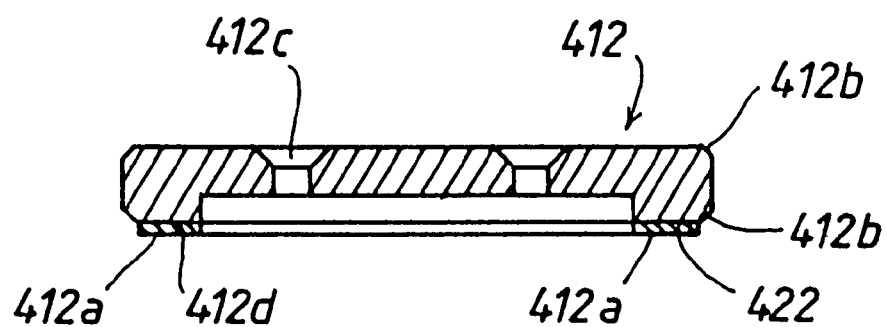

Next, the clamp, another example of support member is shown in FIG. 24. This clamp 412 is a plate type clamp made of ceramics, the bottom surface of which is equipped with film with hardness 450 kg/mm$^2$ or lower, and the contact surface 412a is finished to the flatness 3 μm or lower, and the smooth surface with roughness of 2.0 μm or lower. The outer circumference edge 412b is chamfered to surface C or R and a screw hole 412b is provided for tightening. In addition, a stepped area 412d is provided for being engaged with the hub at the time of installation.

Figure 25:
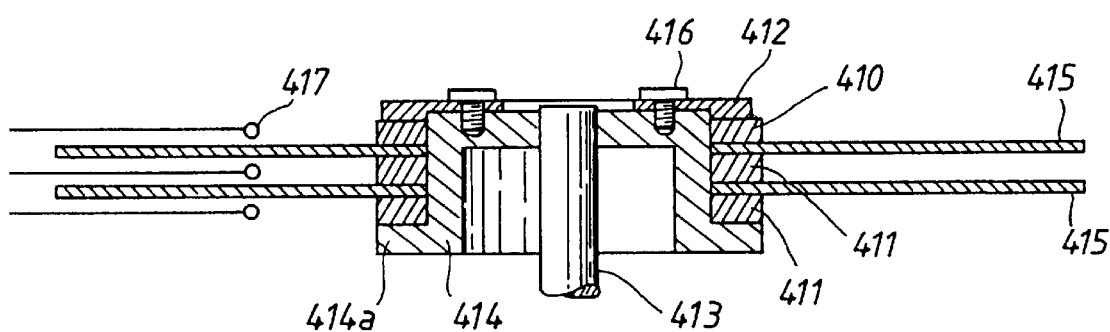
FIG. 25 is a sectional view of a magnetic disk unit according to this invention.

Now, the magnetic disk unit using these shims 410, spacers 411, and clamps 412 is shown in FIG. 25. To the flange portion 414a formed at the hub 414 connected to the rotary shaft 413, ceramic spacer 411 and magnetic disk substrate 415 are arranged alternately, and the top ends of these are retained with shims 410 and clamps 412 and tightened with screws 416, thereby tightening 2 to 8 pieces of magnetic disk substrate 415 are fixed as specified intervals. And with the magnetic head 417 levitating on the surface of the magnetic disk substrate 415 with a minimum distance kept while rotating the hub 414 and each of the magnetic disk substrates 415 by the rotary shaft 413, information is written into and read from the specified position.

For the magnetic disk substrate 415, in general, the aluminum substrate is used, but magnetic disk substrate with a glazed surface formed on the surface of the ceramics such as alumina and the magnetic film equipped on the glazed surface, or the magnetic disk substrate completely formed with the glass substrate and the magnetic film equipped on the surface may be used. In addition, it is possible to use titanium, silicon, YAG, carbon, etc. for other substrate materials.

Because shims 410, spacers 411, and clamps 412, support members of this invention are made of high-rigidity ceramics, they are free from deformation at the time of clamping, and because the contact surface 411a, 412a is finished to the surface with flatness 5 μm or lower, each magnetic disk substrate 415 can be supported at a remarkably high accuracy. Furthermore, because the shims 410, spacers 411, and clamps 412, the support members of this invention, are equipped with comparatively soft film 421, 422 with hardness 450 kg/mm² or lower on the surface, scraping off of magnetic film on the surface of the magnetic disk substrate 415 can be prevented.

In addition, if ceramic disk substrate made of ceramics or glass is used for the magnetic disk substrate 415, the thermal expansion ratio to shims 410, spacers 411, and clamps 412 become approximate one another, and no inconvenience resulting from thermal expansion difference will be generated even if they become high temperature during high-speed rotation. Consequently, it is possible to dramatically reduce the levitation rate of the magnetic head 417 with respect to the magnetic disk substrate and to increase the information recording density.

In the example of FIG. 25, the clamp 412 is designed to support the magnetic disk substrate 415 via the shim 410 but in addition to this, it may be designed to support the magnetic disk substrate by directly coming in contact with the top magnetic disk substrate 415. It may also be designed to bring the hub 414 in contact with the magnetic disk substrate 415 to support. In such event, it is desirable to form the hub 414 with ceramics or glass.

Now, for the material of the said film 421, 422, metal material such as cobalt, nickel, chromium, aluminum, silver, platinum, copper, ferritic stainless steel, and the like or synthetic resin or other materials are used, and should be covered on the support member surface by plating or other methods.

Table 15 shows Vickers hardness of various metal materials and the results of investigation for any sign of metallic powder generated by scraping off of the magnetic film when they are used as film 412. The results clearly indicate that metallic power is not generated and scraping off of the magnetic film can be prevented if the Vickers hardness of the film 421 is set to 450 kg/mm² or lower and preferably 200 kg/mm² or lower. These metal materials provide electric conductivity, providing another effect of easily releasing static electricity generated.

In addition, with respect to the thickness of film 421, 422, if it is thinner than 0.3 μm, the effects of reducing the surface hardness are poor, while if it is thicker than 5 μm, it becomes difficult to achieve the flatness of contact surface 411a, 412a to 5 μm or lower. In actuality, as shown in Table 16, when measurements were taken on the flatness of the contact surface 411a with the thickness of film 421 varied, it was difficult to lower the flatness when the film 421 was thicker than 5 μm.

TABLE 15

| No. | Material | Vickers hardness (kg/mm²) | Any sign of metallic powder generation |
|---|---|---|---|
| *1 | Alumina | 1200–1800 | Present |
| 2 | Cobalt | 147 | None |
| 3 | Nickel | 90–100 | None |
| 4 | Chromium | 130 | None |
| 5 | Aluminum | 15–65 | None |
| 6 | Silver | 30 | None |
| 7 | Platinum | 40 | None |
| 8 | Copper | 35–40 | None |
| 9 | Ferritic stainless steel | 170–200 | None |
| 10 | Austenitic stainless steel | 410 | None |

*indicates a comparison example.

TABLE 16

| Film thickness (μm) | Flatness (μm) |
|---|---|
| 1 | 0.9 |
| 2 | 0.9 |
| 3 | 1.2 |
| 4 | 2.1 |
| 5 | 3.0 |
| 6 | 4.8 |

For the materials composing the support member such as shim 410, spacer 411, and clamp 412, it is possible to use ceramics or glass whose thermal expansion coefficient is $20 \times 10^{-6}/°$ C., and more preferably $12 \times 10^{-6}/°$ C. or less, but for ceramics, as the characteristics are shown in Table 17, alumina ceramics, zirconia ceramics, silicon carbide ceramics, silicon nitride ceramics, alumina-titanium carbide based ceramics, barium titanate, cermet, forsterite ceramics, and others can be used.

Alumina ceramics in Table 17 is a sintered material which contains 90 wt % $Al_2O_3$ and the remainder comprising $SiO_2$, MgO, CaO, etc. The conductive alumina ceramics is a sintered material which contains 70–80 wt % $Al_2O_3$ and the remainder comprising 10–20 wt % $TiO_2$ as a conductivity provider, and the conductive alumina ceramics sintered in the oxidizing atmosphere provides $10^8$ Ω·cm volume specific resistance and that sintered in the reducing atmosphere provides $10^3$–$10^6$ Ω·cm volume specific resistance.

Zirconia ceramics primarily consists of $ZrO_2$ and is partially stabilized zirconia ceramics in which the tetragonal phase is 80 mol % or higher by containing stabilizers such as $Y_2O_3$, CaO, MgO, etc.

In addition, silicon carbide ceramics contains more than 90 wt % SiC and the remainder comprising carbon (C) and boric acid (B), or $Al_2O_3$, $Y_2O_3$, etc., while silicon nitride ceramics contains more than 90 wt % Si3N4 and the remainder comprising $Al_2O_3$, $Y_2O_3$, etc.

The alumina-titanium carbide based ceramics is a sintered material primarily composed of 20–80 wt % $Al_2O_3$ and 80–20 wt % TiC and provides high hardness and electric conductivity. In addition, barium titanate is primarily composed of 10–20 mol % BaO and 90–80 mol % $TiO_2$, and contains at least one type of metallic oxide chosen from Al, Si, Zr, Nb, and Sr at a ratio of 0.01–4.0 parts in weight to 100 parts in weight of the main component, and is fired in the reducing atmosphere.

Cermet is a composite sintered material comprising a ceramic component which forms a hard phase and a metal component which forms a binder phase, and in particular cermet composed of 10–90 wt % TiC and 5–90 wt % TiN, and containing a 5a group metal carbide as an additive and iron group metal as a binder phase is used.

In addition, forsterite ceramics is a sintered material primarily composed of 2 MgO·SiO$_2$ and because the Vickers hardness is as low as 1000 kg/mm$^2$ or lower, forsterite ceramics can be used to prevent damage to magnetic disk substrate 415.

Comparison of the properties of these ceramics with aluminum (metal) used as a comparison example indicates that as clear from Table 11, all these ceramics are difficult to deform at the time of tightening because of their high Young's modulus 13000 kg/mm$^2$ or higher and also difficult to generate inconvenience at the time of high temperature because their thermal expansion ratio is as small as 12×10$^{-6}$/° C.

diamond tools or diamond abrasive grains, and with the ceramic material with high rigidity, it is possible to achieve the flatness and parallelism 4 μm or lower and preferably 1 μm or lower, and more suitably 0.3 μm or lower. And if film 412, 422 is formed 0.3–5 μm or lower in thickness on this, both the flatness and parallelism of the surface can be brought to 5 μm or lower.

In this way, according to this invention, since the support member such as shims, spacers, and clamps is formed with ceramics with thermal expansion ration 20×10$^{-6}$/° C. or lower and preferably 12×10$^{-6}$/° C. or lower and the film with Vickers hardness 450 kg/mm$^2$ or lower is equipped on the contact surface with the magnetic disk substrate, and the flatness of this contact surface is designed to be 5 μm or lower, the magnetic disk substrate can be supported at high accuracy and the levitation rate of the magnetic head can be reduced to 0.1 μm or lower, thereby enabling still higher density recording.

This invention also can provide magnetic disk units with various features such that because the surface hardness of the support member is low, there is no fear of the support member to scrape off the magnetic film of the magnetic disk substrate and the generation of metallic powder can be prevented.

TABLE 17

| | Specific gravity | Young' modulus (kg/mm$^2$) | Vickers hardness (kg/mm$^2$) | Thermal conductivity × 10$^{-6}$/° C. | Volume specific resistance Ω · cm |
|---|---|---|---|---|---|
| Alumina | 2.7 | 7200 | 65 | 24.2 | 10$^{-8}$ |
| Alumina ceramics | 3.5–4.0 | 25000–40000 | 1200–1800 | 6.5–8.0 | 10$^{13}$–10$^{15}$ |
| Conducive alumina | 3.5–4.0 | 25000–40000 | 1000–1200 | 6.5–8.0 | 10$^3$–10$^8$ |
| Zriconia ceramics | 5.5–6.0 | 20000–26000 | 1200–1400 | 9.5–11.5 | 10$^{13}$–10$^{15}$ |
| Silicon carbide ceramics | 2.8–3.5 | 35000–45000 | 2300–2500 | 3.5–4.5 | 10$^2$–10$^6$ |
| Silicon nitride ceramics | 2.8–3.5 | 30000–35000 | 1400–1600 | 2.5–3.5 | 10$^{13}$–10$^{15}$ |
| Alumina-titanium carbide ceramics | 4.0–4.5 | 40000–45000 | 1850–1950 | 6.5–8.0 | 10$^{-2}$–10$^{-1}$ |
| Barium titanate | 4.0–4.5 | 17000–20000 | 1500–1900 | 8.0–10.0 | 10$^2$–10$^6$ |
| Cermet | 5.5–7.5 | 40000–50000 | 1400–1800 | 7.0–8.0 | 10$^{-4}$–10$^{-1}$ |
| Forsterite ceramics | 2.7–3.1 | 13000–16000 | 700–1000 | 8.0–12.0 | 10$^{14}$– |

And the material with the approximate thermal expansion ratio should be used in accord with the material of the magnetic disk substrate 415. For example, if ceramic magnetic disk substrate 415 is used, ceramics with thermal expansion ratio 10×10$^{-6}$/° C. or lower in Table 17 should be used as support member, and similarly, when glass (thermal expansion ratio 8.0–9.0×10$^{-6}$/° C.) magnetic disk substrate is used, it is most suitable that ceramics such as forsterite, etc. with thermal expansion ratio 8×10$^{-6}$/° C. or higher in Table 15 should be used as support member.

In the support member of this invention, it is important to keep the flatness of contact surface 411a, 412a to 5 μm or lower and preferably 1 μm or lower and more suitably 0.3 μm or lower, and providing the contact surface 411a, 412a with this kind of excellent flatness enables accurate positioning of each magnetic disk substrate 415 as well as further high-density recording. In addition, with the same reasons, the parellelism between the top and the bottom contact surfaces 411a, 412a should be 5 μm or lower and preferably 3 μm or lower.

For example, in order to achieve the 5-μm or lower parallelism between the contact surfaces 411a, 412a of the support member comprising the said ceramic materials, using a double-end grinding machine or polishing machine, the ceramic material should be ground or polished with

What is claimed is:

1. A magnetic disk substrate support member formed of glass or ceramic for supporting a magnetic disk substrate, the support member defining top and bottom contact surfaces, the support member defining a center hole and at least one through hole, and a conductive material disposed in the at least one through hole for providing electrical conductivity between the top and bottom contact surfaces.

2. The magnetic disk substrate support member of claim 1, wherein the conductive material comprises a conductive spring disposed in the through hole.

3. The magnetic disk substrate support member of claim 1, wherein the conductive material comprises a conductive film coated on an inner wall of the through hole.

4. A magnetic disk substrate support member formed of glass or ceramic for supporting a magnetic disk substrate, the support member being as-sintered chamfered and ring shaped and having a contact surface in contact with the magnetic disk substrate supported thereby, an inner side surface defining an inner diameter of said ring shaped member, an outer side surface defining an outer diameter of said ring shaped member, an as-sintered chamfered inner edge joining the contact surface and the inner side surface, and an as-sintered chamfered outer edge joining the contact surface and the outer side surface, wherein a ratio between a first area of the contact surface of the chamfered support member and a second area of a contact surface of a non-chamfered support member having identical inner and outer diameters as said chamfered support member is between 0.70 and 0.95.

5. The magnetic disk substrate support member of claim 4, wherein the contact surface is flat to within 3 μm.

6. The magnetic disk substrate support member of claim 4, wherein the support member defines at least one through hole having an inner wall substantially perpendicular to the contact surface.

7. The magnetic disk substrate support member of claim 4, wherein the support member comprises at least one of a spacer and a shim, the magnetic disk substrate comprises at least one of glass and ceramic, and further comprising a substantially cylindrical hub, a rotary shaft, and a clamp, and wherein the magnetic disk substrate is arranged on the substantially cylindrical hub and fixed to the rotary shaft via at least one of the spacer and the shim and supported by the clamp.

* * * * *